US009870594B2

(12) United States Patent
Dildy

(10) Patent No.: US 9,870,594 B2
(45) Date of Patent: Jan. 16, 2018

(54) METHODS AND SYSTEMS FOR ANALYZING AND PROVIDING DATA FOR BUSINESS SERVICES

(75) Inventor: Glenn Alan Dildy, Rolling Hills Estates, CA (US)

(73) Assignee: Glenn Alan Dildy, Rolling Hills Estates, CA (US)

( * ) Notice: Subject to any disclaimer, the term of this patent is extended or adjusted under 35 U.S.C. 154(b) by 0 days.

(21) Appl. No.: 13/330,309

(22) Filed: Dec. 19, 2011

(65) Prior Publication Data

US 2012/0185300 A1   Jul. 19, 2012

Related U.S. Application Data

(60) Provisional application No. 61/424,453, filed on Dec. 17, 2010.

(51) Int. Cl.
| | | |
|---|---|---|
| *G06Q 50/12* | (2012.01) | |
| *G06Q 10/06* | (2012.01) | |
| *G06Q 30/02* | (2012.01) | |
| *G06Q 30/06* | (2012.01) | |

(52) U.S. Cl.
CPC ......... *G06Q 50/12* (2013.01); *G06Q 10/0637* (2013.01); *G06Q 30/0201* (2013.01); *G06Q 30/0202* (2013.01); *G06Q 30/0241* (2013.01); *G06Q 30/0631* (2013.01)

(58) Field of Classification Search
USPC ....................................................... 705/7.36
See application file for complete search history.

(56) References Cited

U.S. PATENT DOCUMENTS

| | | | | |
|---|---|---|---|---|
| 5,990,885 A * | 11/1999 | Gopinath | ...................... | 715/716 |
| 6,055,512 A * | 4/2000 | Dean et al. | ..................... | 705/17 |
| 6,356,874 B1 * | 3/2002 | Ohrn | ................................ | 705/6 |
| 6,862,525 B1 * | 3/2005 | Beason et al. | ................ | 701/454 |
| 2002/0011951 A1 * | 1/2002 | Pepin et al. | ............. | 342/357.13 |
| 2002/0147619 A1 * | 10/2002 | Floss et al. | ....................... | 705/5 |
| 2003/0071856 A1 * | 4/2003 | Nagahara | ................ | G06F 3/011 |
| | | | | 715/850 |
| 2004/0178889 A1 * | 9/2004 | Buckingham et al. | ........ | 340/328 |
| 2006/0017547 A1 * | 1/2006 | Buckingham et al. | ........ | 340/328 |
| 2007/0027852 A1 * | 2/2007 | Howard | ................ | G06F 3/0237 |
| 2007/0244633 A1 * | 10/2007 | Phillips et al. | ............... | 701/207 |
| 2009/0157560 A1 * | 6/2009 | Carter et al. | .................... | 705/80 |
| 2010/0030578 A1 * | 2/2010 | Siddique et al. | ................. | 705/3 |
| 2010/0076968 A1 * | 3/2010 | Boyns et al. | ................. | 707/732 |
| 2010/0250707 A1 * | 9/2010 | Dalley et al. | ................. | 709/219 |
| 2010/0309149 A1 * | 12/2010 | Blumenberg et al. | ........ | 345/173 |
| 2011/0035284 A1 * | 2/2011 | Moshfeghi | ................ | 705/14.58 |
| 2011/0282826 A1 * | 11/2011 | Schwendimann et al. | ..... | 706/54 |
| 2012/0203597 A1 * | 8/2012 | Jagdev et al. | ............... | 705/7.38 |
| 2013/0317944 A1 * | 11/2013 | Huang et al. | .............. | 705/26.61 |
| 2014/0304085 A1 * | 10/2014 | Liu et al. | ................... | 705/14.66 |

* cited by examiner

*Primary Examiner* — Leland Marcus
(74) *Attorney, Agent, or Firm* — Arent Fox LLP

(57) ABSTRACT

Apparatus and methods for collecting information may include receiving one or more inputs of information related to a business experience. In addition, the apparatus and methods may include storing the received business information. The methods may also include analyzing the received information to generate one or more targeted recommendations; and forwarding the one or more targeted recommendations to management of the business.

18 Claims, 29 Drawing Sheets

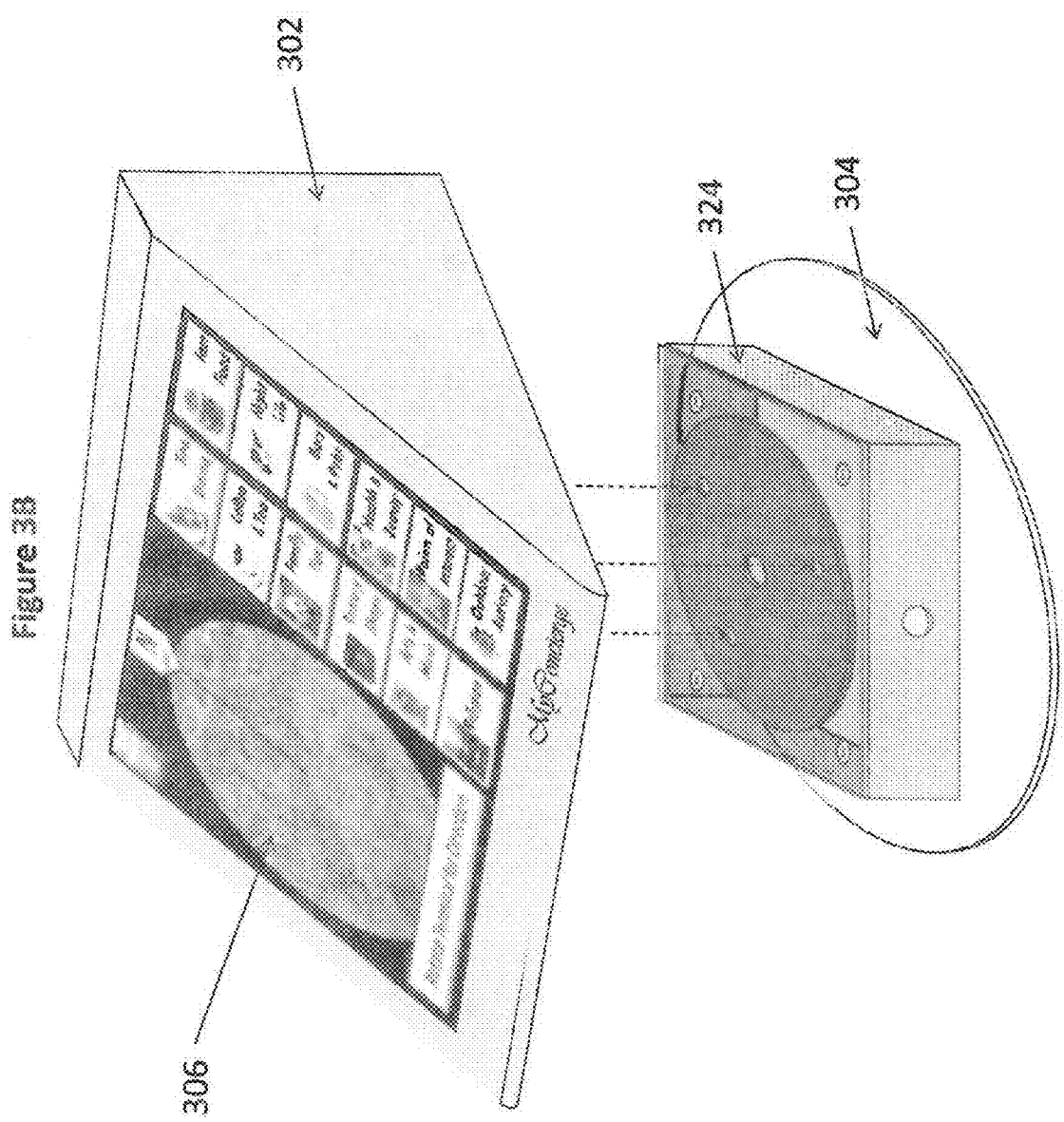

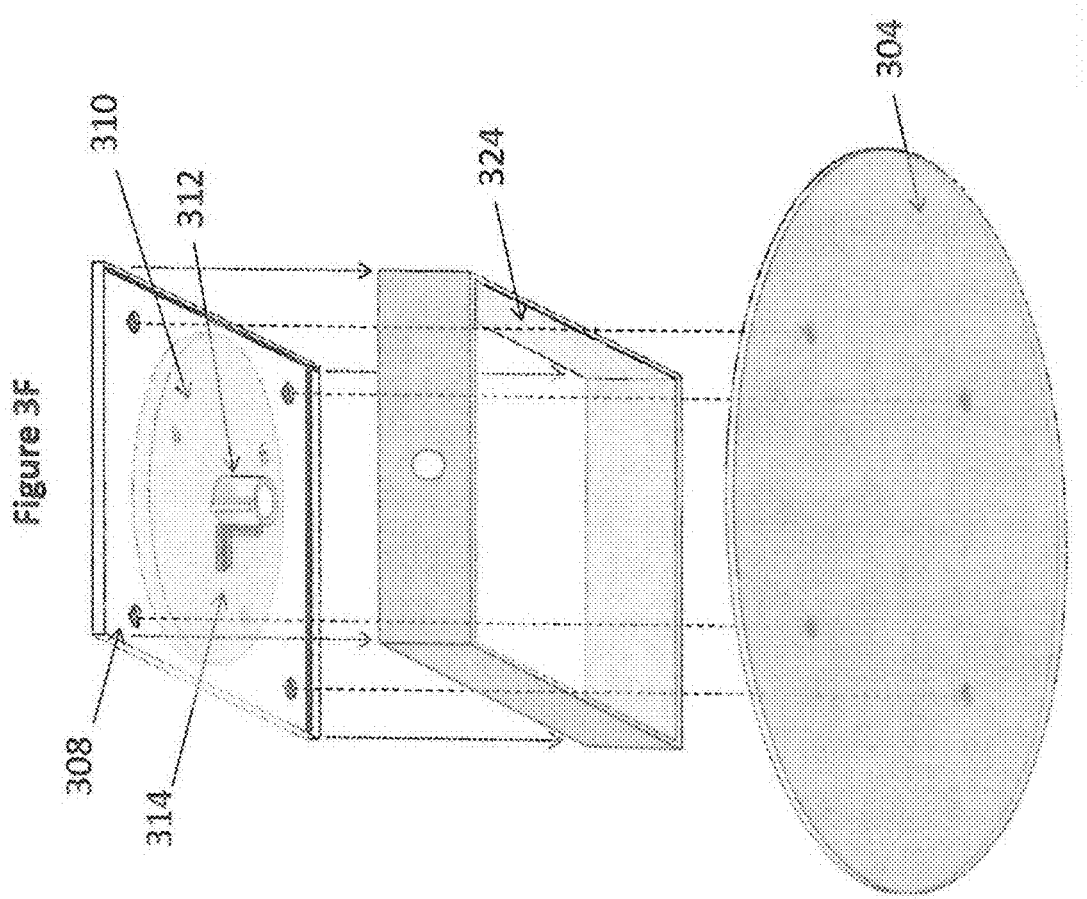

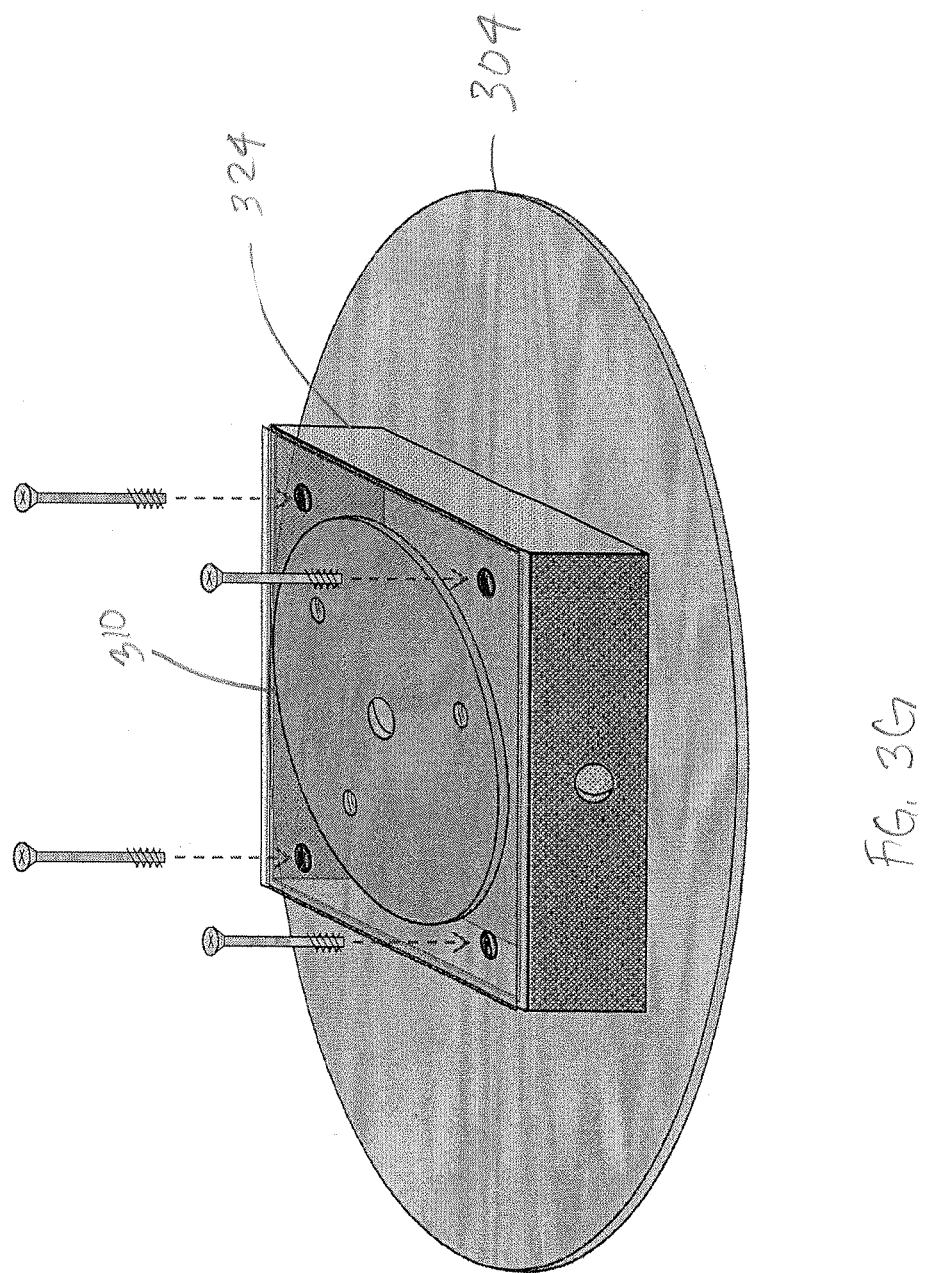

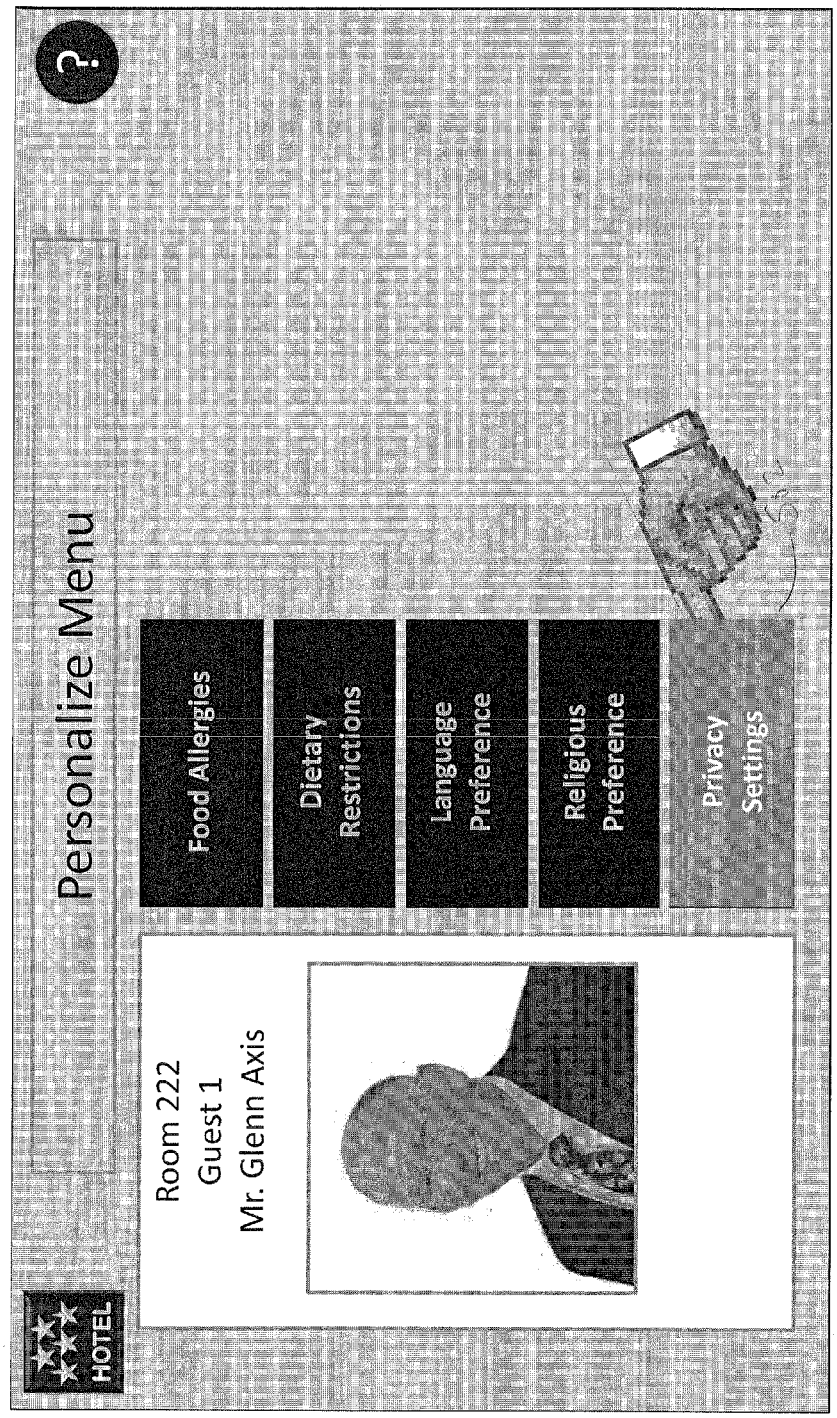

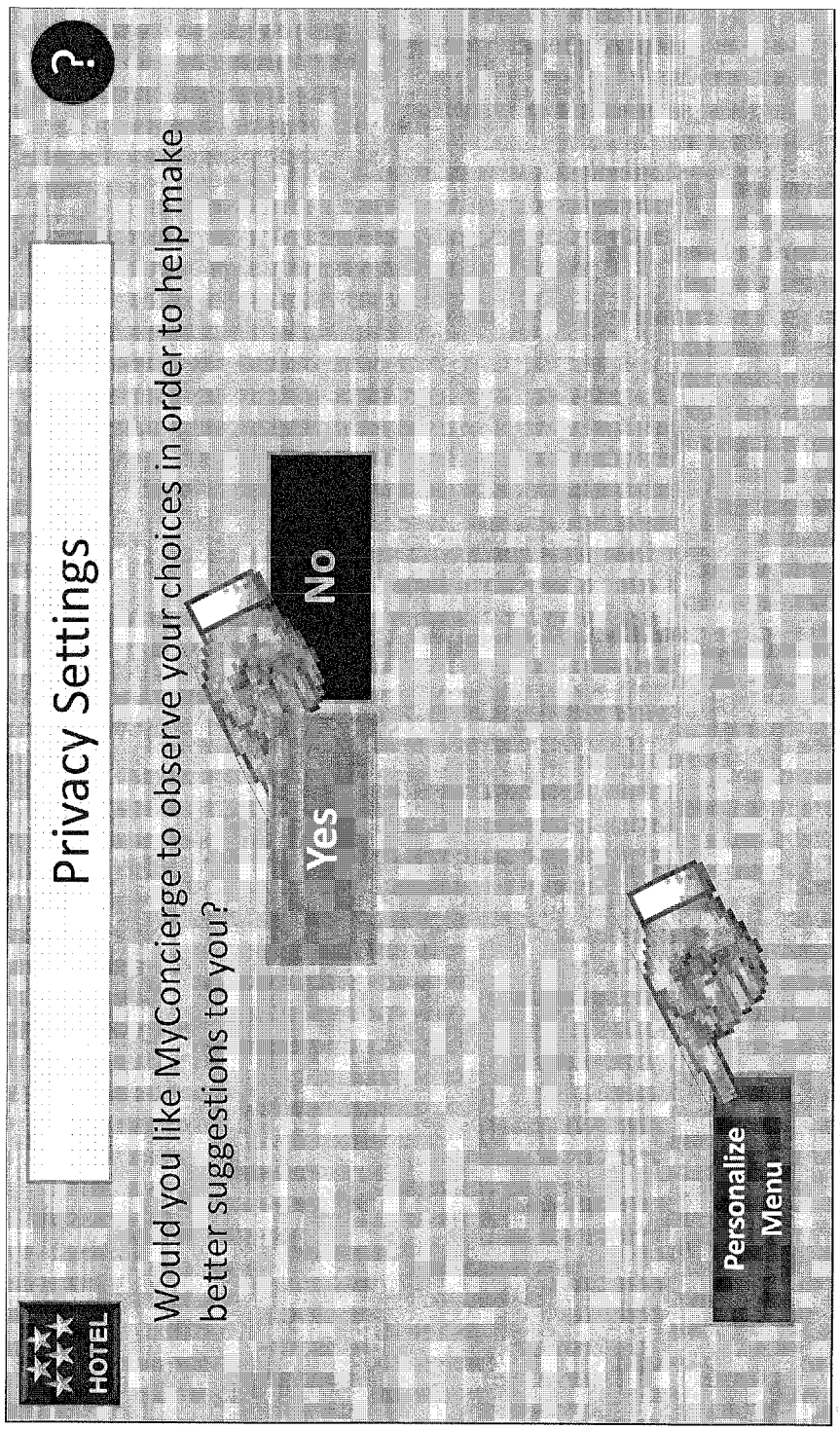

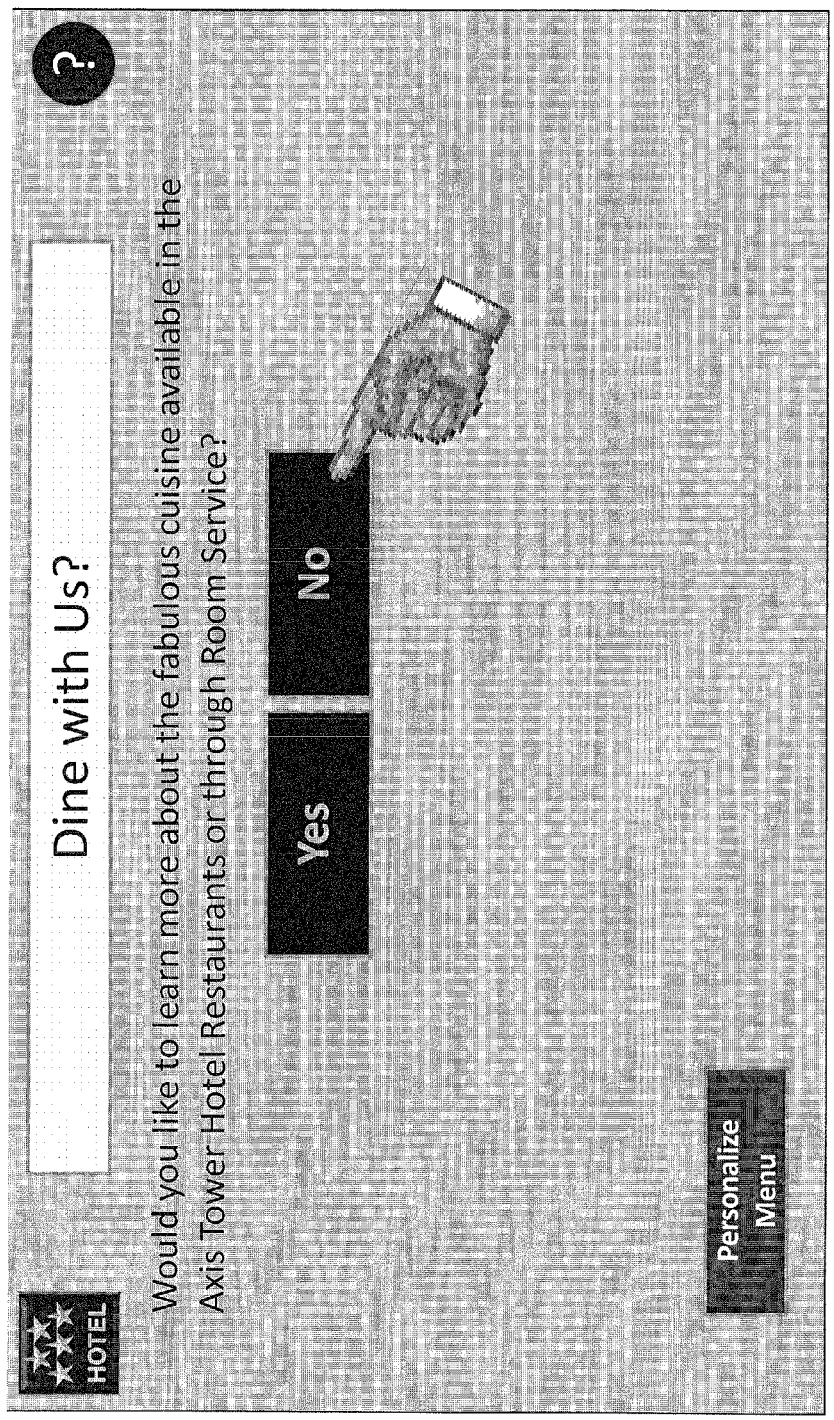

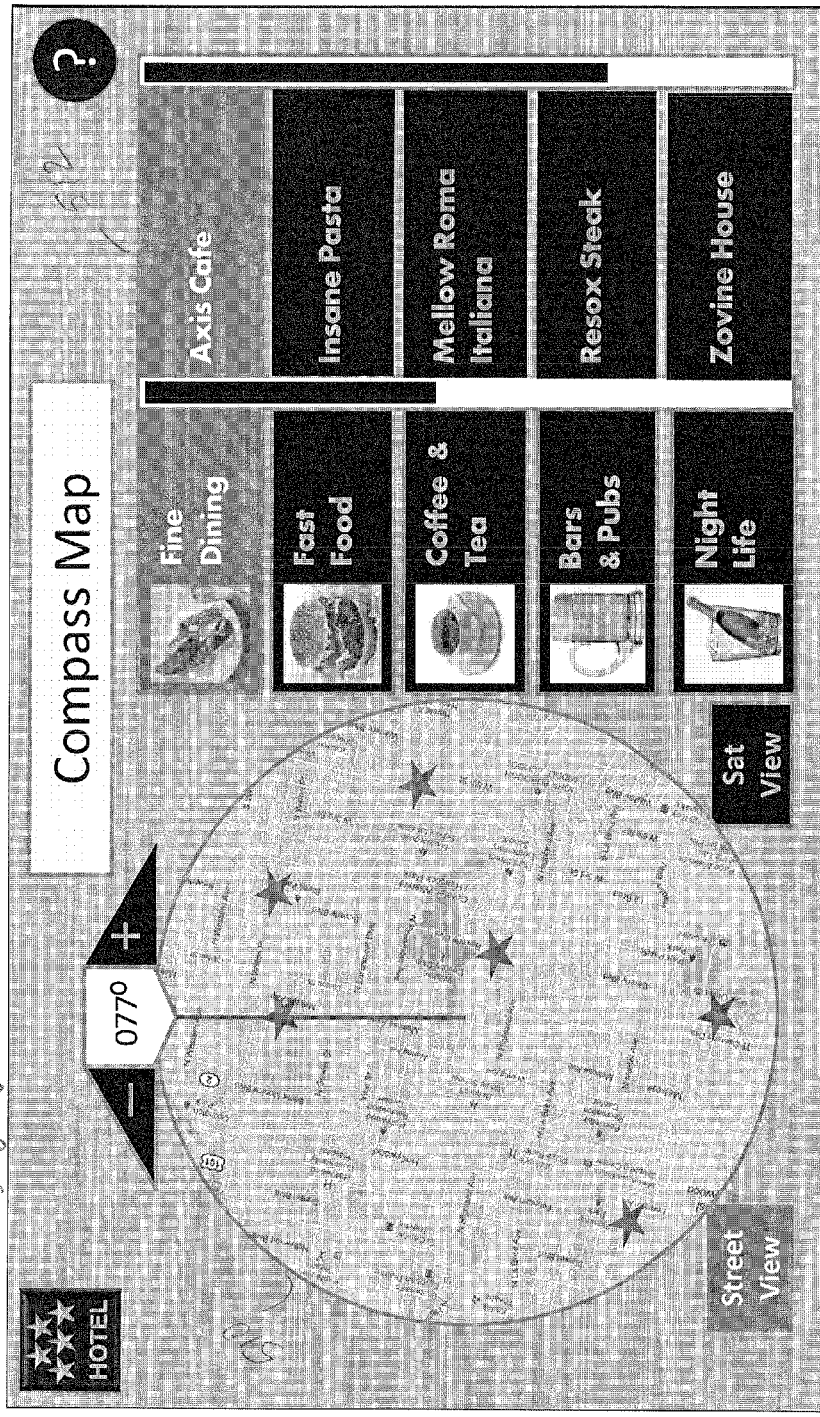

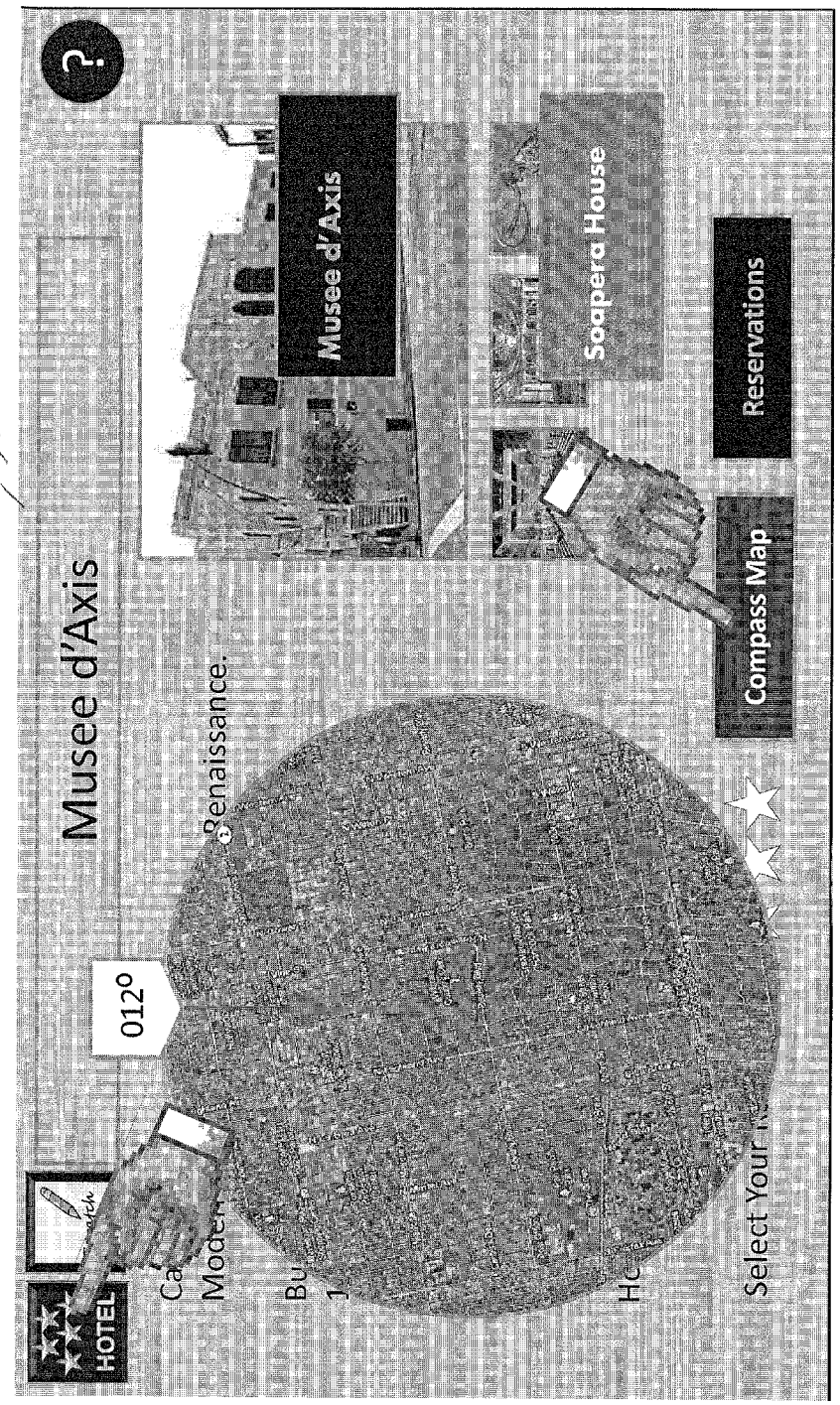

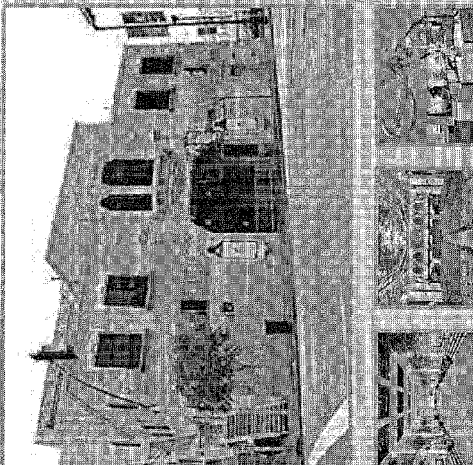

Eggs Benedict

Ingredients:
2 slices Sourdough Bread
3 tbsp Hollandaise Sauce
4 slices Canadian Bacon
2 large Poached Eggs Sourdough Bread topped with ham, poached eggs and Hollandaise sauce (A rich creamy sauce made of butter, egg yolks, and lemon juice)

Price: $1

2 Orders          $31.00
Service Charge    N/A
TOTAL             $31.00

Review Order
Order Request
Food Menu
Add To Order

FIG. 5N

Nurturing Body Wash Cream

Our original Crème de Corps body cream has been a favorite preparation among our cherished patrons for decades. Rich in skin-nurturing ingredients ideal for hydrating dry skin, our nurturing body wash is enriched with the fine ingredients to thoroughly cleanse a[nd moist]urize.

[Select] 2.5 fl oz Tube  $ 9.00
[Select] 7.5 fl oz Tube  $19.00

| | |
|---|---|
| 1 Order | $ 9.00 |
| Service Charge | $ 5.00 |
| CA Sales Tax | $ 1.12 |
| TOTAL | $15.12 |

Review Order

Product Menu

Add to Order

FIG. 5T

METHODS AND SYSTEMS FOR ANALYZING AND PROVIDING DATA FOR BUSINESS SERVICES

CROSS-REFERENCE TO RELATED APPLICATIONS

This application claims priority to U.S. Provisional Application No. 61/424,453, titled "Methods and Systems for Analyzing and Providing Data for Hotel Services," filed on Dec. 17, 2010, which is incorporated by reference herein in its entirety.

BACKGROUND OF THE INVENTION

Field of the Invention

Aspects of the present invention relate to methods and systems for analyzing, collecting, and providing data for business services. In particular, aspects of the present invention relate to methods and systems for aiding business in providing guest services, collecting information for guest services, and tracking guest information directly from guests who are using computer-aided devices.

Background

A typical hotel has a large number and/or variety of guests staying with the hotel during a calendar year. The hotel typically attempts to cater to a majority of hotel guests by providing a wide variety of dining options, hotel amenities, and hotel services to encourage the hotel guests to spend time and/or money in the hotel. If the hotel guests dine outside of the hotel, the hotel may have difficulty tracking hotel guests' preferences and the hotel loses the revenue from the hotel guest dining in the hotel. Thus, there is a need in the art for methods and systems for capturing data relating to hotel guests, performing trend analysis and data mining based upon the captured data, and generating reports based upon the analysis. A similar situation occurs with restaurants, where individuals are interested in specific types of ordering options and specials. Such systems and methods would enable the hotel or restaurant to provide targeted services and/or advertising to a guest staying in a hotel to increase the amount of time and/or money the hotel guest spends in the hotel.

Additionally, guests want a full-service hotel that caters to their preferences, and therefore it is essential to capture information about and offer the best services in the area specific to a guest's needs. Hotel guests may ask hotel staff, such as concierges, for recommendations for dining options and/or places of interest around the hotel. Hotel staff frequently changes jobs and/or positions within the hotel. Thus, the hotel as an organization may not be able to retain the information available to any specific hotel staff, e.g., what restaurants are popular and/or what events guests enjoy attending. Therefore, there is a further need in the art to capture the knowledge of the hotel staff about the hotel guests' preferences and correlate the hotel staff's knowledge with the captured data when generating the reports and recommendations.

SUMMARY

Aspects of the present invention include methods and apparatus for collecting and analyzing data. The methods and apparatus may include receiving one or more inputs of information related to a business experience and storing the received information. In addition, the methods and apparatus may include analyzing the received information to generate one or more targeted recommendations. The methods and apparatus may include forwarding one or more targeted recommendations to management of the business.

Aspects of the present invention may also include methods and apparatus for receiving one or more user inputs of information related to a business experience. The methods and apparatus may further include storing the received information and performing an action based upon the received information.

Additional advantages and novel features relating to aspects of the present invention will be set forth in part in the description that follows, and in part will become more apparent to those skilled in the art upon examination of the following or upon learning by practice thereof.

DESCRIPTION OF THE FIGURES

In the drawings:

FIGS. 3A-3G illustrate a device in accordance with yet another aspect of the present invention;

DETAILED DESCRIPTION

Figure 1:
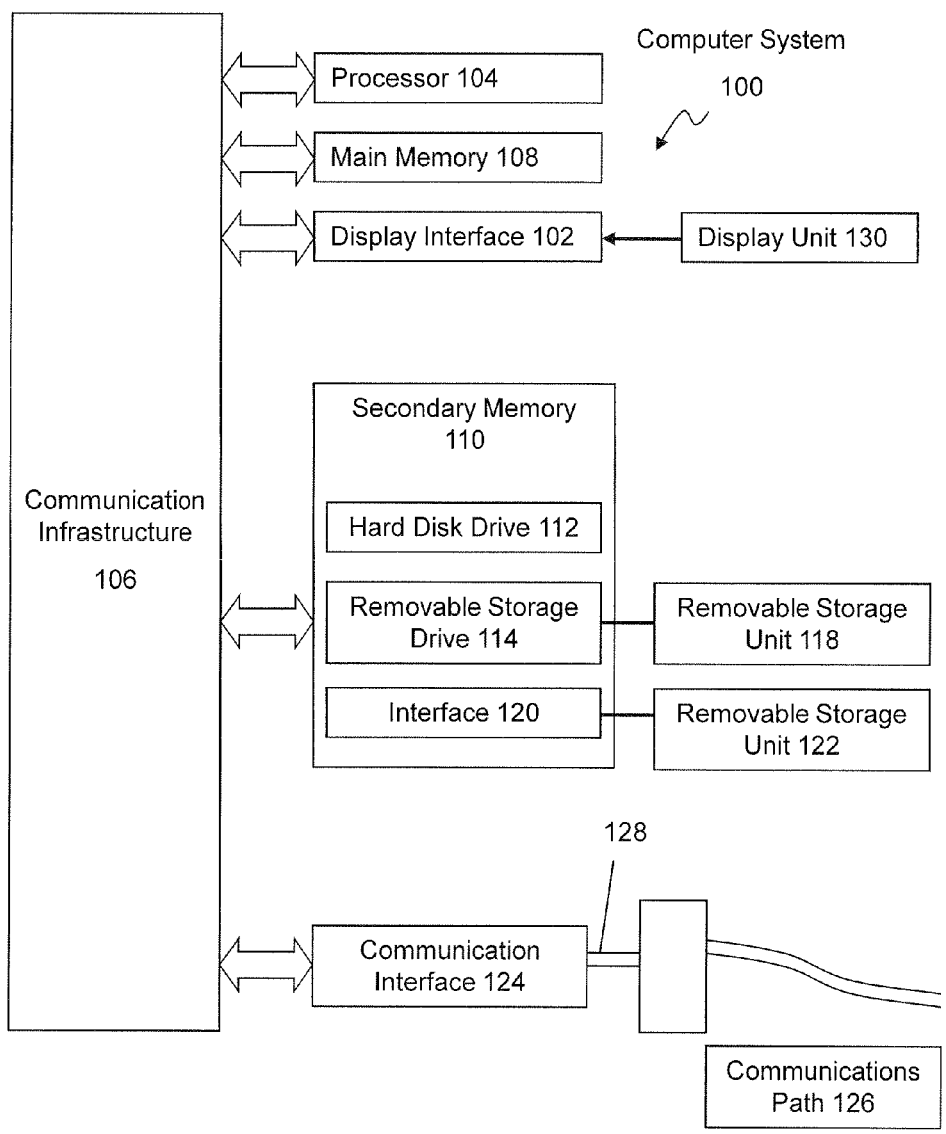
FIG. 1 illustrates various features of an example computer system for use in conjunction with aspects of the present invention.

Aspects of the present invention relate to methods and systems for, among other purposes, aiding business, such as but not limited to, hotels, restaurants, cruise ships, malls, and condominiums in providing guests services and tracking employee knowledge and guest information. In addition, aspects of the present invention also relate to methods and systems for aiding business guests during the guests' visit to the business (e.g., during the guests' stay at the hotel or meal at a restaurant) and aiding business guests before and after the visit.

Aspects of the present invention may be implemented via one or more user interface features (also referred to interchangeably herein as "platforms"), which assist users with enhancing their experience at a given business, such as a hotel or restaurant. While the below description provides hotel and restaurant examples, it should be noted that the described aspects may relate to a variety of businesses including, but not limited to, hotels, restaurants, cruise ships, malls, and condominiums. The interactive platform may provide flexibility for customizing unique or specific issues relating to a particular restaurant or hotel and/or guests. For example, the platform may receive inputs regarding personal and/or restaurant or hotel preferences, such as language preferences and/or dietary preferences, among other user preferences.

The interactive platform may include a series of interactive interfaces and other database or repository interfaces that may provide at least the following capabilities: personalizing the interactive platform; controlling room comforts (e.g., the room lighting, temperature and blinds); ordering room service, event tickets, or car services; providing information and/or messages about events taking place in the hotel (e.g., happy hour in forty five minutes or the end of the breakfast buffet in thirty minutes); providing information about hotel amenities (e.g., hotel dining options, hotel spa and fitness centers, and shops in the hotel); providing information about area attractions and dining options; providing maps and directions to area attractions and/or restaurants; capturing data relating to the selected services and/or dining options by the user; analyzing the captured data; and providing reports and user notifications based upon the analyzed data, among other system capabilities. The series of interactive interfaces may be organized by menus and/or icons on a screen, for example, as illustrated in FIGS. 5A-5U.

After a user logs into the system, the user may have access to information for any number of hotel services and/or area attractions, for example. The type of information the user may be able to use may depend on what data has been made available and the level of the user's privileges on the system. For example, a user may be a hotel guest, which may allow the user to have access to the hotel information, area attraction information, dining information, or other information that may be of interest to the hotel guest. The hotel guest also may have the option to select different levels of increasing privacy when using the system. For example, the guest may select the various levels of privacy (e.g., a highly restrictive privacy option if the guest is accompanied to the hotel by a family member and a lower restrictive privacy option if the guest is unaccompanied).

Another user may be hotel staff, such as a concierge or hotel manager, which may allow the user to input information and/or recommendations into the system. For example, the concierge may input recommendations for popular restaurants in the area and/or local area attractions along with annotations about the type of guest that would prefer that item. The recommendations may be transmitted and displayed on the interactive interface for other users of the system to view. Hotel staff may also input demographic information and/or other guest information into the system that may be correlated with the received inputs from hotel guests to provide statistics and/or other data analysis on the received guest information.

In addition, hotel staff may receive requests on the system from other users of the system, such as hotel guests. For example, if a hotel guest requests tickets to a theater event using the system, the hotel staff may receive a notification by the system that the hotel guest has requested the tickets and may purchase the requested tickets for the hotel guest. In addition and/or alternatively, the hotel staff may provide the hotel guest recommendations for seat selection, transportation, and/or dining options near the theater.

In an aspect, the system may analyze data provided by the users and generate reports based upon the data. Hotel staff may have access to reports generated based upon information provided by hotel guests using the system. For example, a report may indicate that a majority of hotel guests are using the interactive interface to select dining options at an Asian restaurant nearby the hotel, and thus, the hotel may decide to increase the amount of Asian food offered on the hotel restaurant's menu based upon the report. The analyzed data may be used to tailor the services being offered by the hotel and/or to increase the amount of revenue generated by the hotel. In addition, the analyzed data may be used to tailor the information presented to the user. For example, if the user selects a vegetarian dietary preference, the system may provide the user with information for restaurants in the hotel and surrounding area that have vegetarian food options.

Figure 3A:
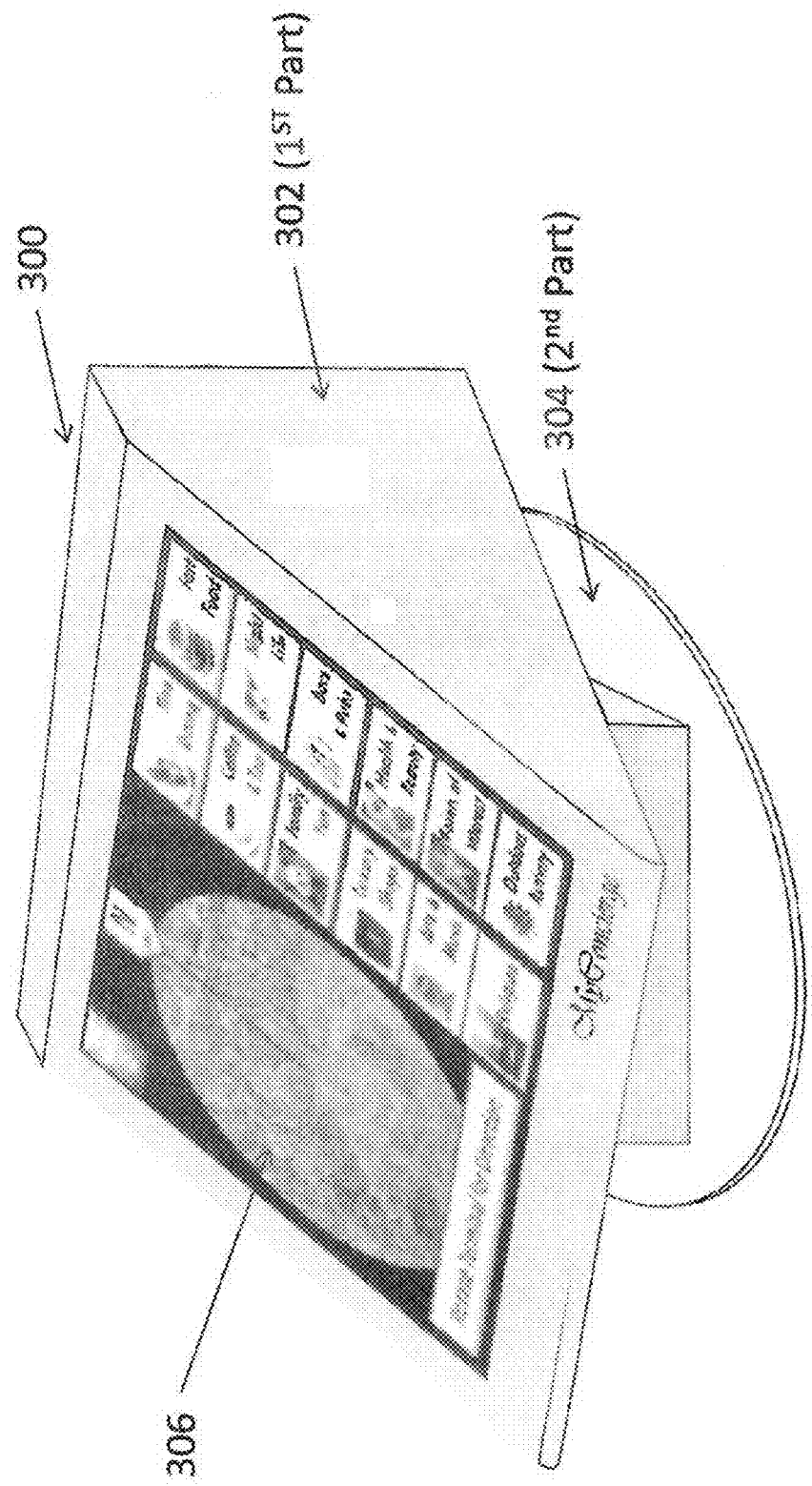

The interactive platform may be included in a device, such as a terminal 300 as illustrated in FIG. 3A. Terminal 300 may include a first part 302 which may include an interface 306 for receiving inputs from the user and/or outputting information to the user. Interface 306 may include, for example, a display, a keyboard, a speaker, and/or a microphone, among other interfaces. In an aspect, interface 306 may be a touch screen display that can display information to a user and/or receive inputs from a user. User inputs may include, but are not limited to, selecting a category of information (e.g., dining options, fitness center, event tickets, or hotel information), ordering food from room service, scheduling an appointment, setting an alarm, or controlling features in the room, among other forms of user input. The first part 302 may also include a computing system that communicates with the interface 306 to process the user's inputs and/or provide information to the user.

Terminal 300 may also include a transmitter and a receiver for interfacing with one or more systems external to the terminal 300. One or more systems may include, but are not limited to, controls in the room (e.g., light controls, temperature controls, television controls, radio controls, and curtain controls); a computing system (e.g., a server, a cloud hosting system, and a data repository); or a hotel system (e.g., a concierge phone and/or messaging system); among other systems. For example, interface 306 may receive an input from the user to adjust the room temperature (e.g., increase and/or decrease the temperature). Terminal 300 may interface with temperature controls in the room to adjust the room temperature accordingly based upon the received user input. In an aspect, terminal 300 may use a wireless connection, such as WiFi, to connect to a cloud computing system that may include information relating to the hotel and/or the surrounding area. In addition, the terminal 300 may transfer the users' selections to the computing system that may store and analyze the received data.

In another aspect, terminal 300 may use infrared signaling to control the lights in the room (e.g., lower and/or increase the lights). For example, the user may input commands into the interface 306 to lower the lights in the hallway. Commands may occur, for example, via text or voice. Terminal 300 may send a control signal to the light switch in the hallway to lower the lights. It should be appreciated that the user may use the terminal 300 to control one or more controls in the room.

Terminal 300 may further include a magnetometer and/or compass for detecting directional movement of the terminal 300 and/or providing directional information to attractions surrounding the hotel. It should be appreciated that the directional information may include, but is not limited to, cardinal and ordinal directions; a graphical representation of the surrounding area; and names, locations and distances from the hotel to the locations and/or attractions; among other directional information.

Terminal 300 may also include a power supply and a power cord. In an aspect, the power supply may include a rechargeable battery that may last around six to eight hours before requiring recharging. Terminal 300 may also incorporate one or more handles to allow the hotel guest to transport terminal 300 between locations inside and/or outside the hotel, such as near a window or on a patio. Thus, terminal 300 may be portable and capable of moving around a room for easier use and/or accessibility. In an aspect, terminal 300 may also include software for playing a selection of videos and music favorites, for example, through speakers and/or a display on terminal 300 based on the hotel guests' preferences as cataloged during previous visits.

In addition, terminal 300 may include a second part 304 that is operably connected to the first part 302. The second part 304 may be, for example, a rotating base that may include a rotating threshold that prevents the base 304 from rotating past the threshold. For example, the rotating base 304 may include a physical stop to prevent the base 304 from rotating more than three hundred and sixty degrees. In an aspect, the base 304 may include a non-skid material, such as rubber, plastic, or neoprene, among with other non-skid materials, affixed to the base 304 to prevent damage to the furniture and/or fixtures from the terminal 300. In addition, the second part 304 may surround the power cord and/or other power supplies for the terminal 304.

It should be appreciated that terminal 300 may be made of a variety of materials that are durable. In an aspect, terminal 300 may be stainless steel with a glass touch screen for interface 306. In addition, terminal 300 may be made of a material that is easy to clean and disinfect between uses without damaging the internal electronics and/or exterior finishes. Using a material that is easy to clean and disinfect may allow a user to use the terminal 300 without the worry of contracting diseases.

Referring now to FIGS. 3B-3G, example diagrams illustrate various components of terminal 300 in accordance with an aspect of the present invention. Referring to FIG. 3B, the first part 302 of terminal 300 may be operably connected to the second part 304, e.g., a base, of terminal 300 via, for example, a housing 324. The housing 324 may allow the first part 302 to rotate relative to the base 304 so that a user may view the interface 306 from a variety of positions. In addition, a user may rotate the first part 302 when using a compass component and/or map component of the interface 306 to identify various locations and/or positions surrounding the terminal 300.

Figure 3C:
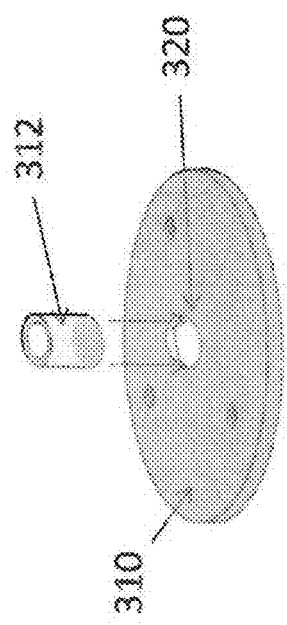
Figure 3D:
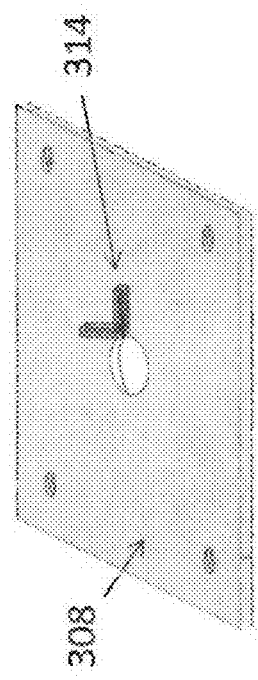
Figure 3E:
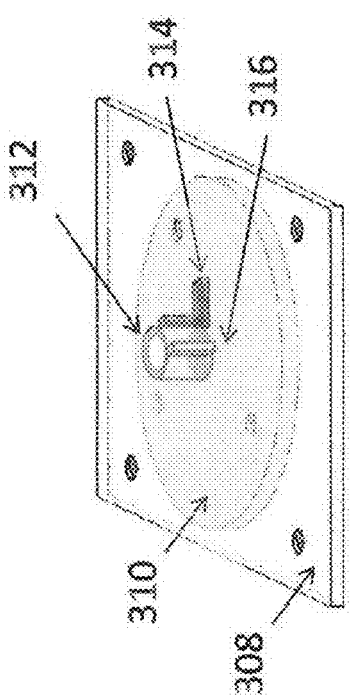

Referring now to FIGS. 3C-3F, therein illustrated are example components of housing 324 in accordance with an aspect of the present invention. Housing 324 may comprise a support base 308 in the shape of a square operably connected to a support collar 310 in the shape of a circle. The support collar 310 may include a center hole 320 into which a cylinder 312 may be operably connected, as illustrated in FIG. 3C. For example, the cylinder 312 may be welded to the support collar 310 and the center hole 320. The support collar 310 may also have a rotation stop 314 operable to prevent the support collar 310 from rotating more than three hundred and sixty degrees, as illustrated in FIGS. 3C-3F. The cylinder 312 may have a spline 316 connected to the cylinder 312 so that when the spline 316 comes into contact with the rotation stop 314, the support collar 310 may be prevented from rotating more than three hundred and sixty degrees.

Figure 4:
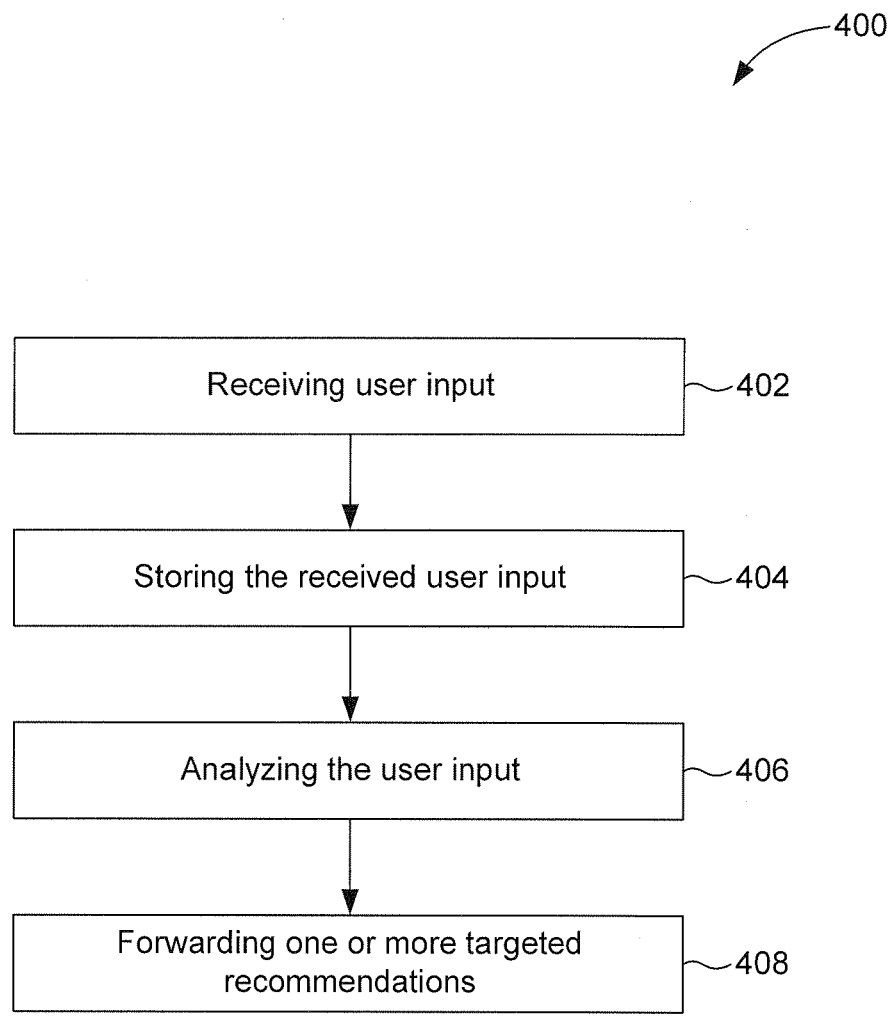
FIG. 4 illustrates an example method of analyzing data in accordance with another aspect of the present invention.

Referring now to FIG. 4, method 400 for analyzing data captured via the interactive platform may include receiving user input 402. For example, the user inputs may include information relating to a business experience, such as a hotel experience or restaurant experience. User input may include, but is not limited to, guest demographic information (e.g., age or gender), recommendations (e.g., restaurant and/or event recommendations), selecting a category of information (e.g., dining options, fitness center, event tickets, or hotel information), ordering food from room service, scheduling an appointment, setting an alarm, or controlling features in the room, among other forms of user input. For example, the system may transmit the received user input to a remote computing system, such as a cloud computing architecture for data processing and/or storage.

The method 400 may also include storing the received user input 404. The received user input may include metadata, such as a user identification (ID), a device ID, or a hotel ID, among other metadata. In an aspect, the received user input may be stored in a data repository on the remote computing system based upon the metadata, e.g., the user ID, the device ID and/or the hotel ID. It should be noted that the user may also create a profile specifying that the information received from the user input may not be allowed to be collected and/or cataloged.

In an aspect, the method may include performing an action based upon the received input. Actions may include, but are not limited to, presenting a room service menu, providing an order for room service, turning on a light, turning off a light, adjusting a room temperature, providing directions to a location, ordering tickets to an activity, making a reservation at a restaurant, and purchasing products, among other actions.

The method may further include analyzing the received user input 406. Analyzing the received user input may include applying one or more algorithms to the user input. The algorithms may include, but are not limited to, searching for patterns in the user input; discerning subcategories of users that would be interested in dining at a particular restaurant; determining what type of food a user would typically eat; examining menus to determine what categories of cuisine to offer the user based upon the determinations; providing trends and/or statistics based upon user demographic information and/or user purchase histories; and providing targeted recommendations to users based upon past selections and/or purchases, among other algorithms. The algorithms may also include predictive algorithms capable of anticipating and assessing the probability of when a specific guest may return to the hotel, unaccompanied or not, and the possible reason for the trip. Information within this system may also be analyzed in conjunction with publicly accessible data sources to provide up-to-date information, as well as aggregation of public and hotel recommendations. Information input from the hotel staff will also be integrated, and a set of weighted algorithms applied to come up with the best aggregate recommendations for guests. This may allow the hotel to send tailored information to guests ahead of time with upcoming events and possible products and services.

The method may further include forwarding one or more targeted recommendations to management of the business 408, such as management of the hotel or restaurant. Targeted recommendations may include, but are not limited to, changing services provided by the hotel (e.g., adding spa services to the hotel); providing advertisements for services offered by the hotel; changing dining options in the hotel (e.g., adding and/or removing cuisines offered by the hotel), and changing amenities provided by the hotel (e.g., fitness centers, pools, etc.). In one aspect, the targeted recommendations may include one or more generated reports based upon the analyzed data. The reports may include general statistics based upon an average of hotel guests and/or the reports may categorized by user demographics, time of year, time of day, or other subcategories for reporting. In addition, the reports may be customized based upon user input. For example, the user may enter in categories and/or a date range for generating the reports. Thus, the reports may be used by the hotels to target the services provided by the hotel (e.g., the type of food offered on the menus, the type of restaurants in the hotel, and amenities and/or services provided by the hotel) so that the hotel may provide better customer services and/or increase revenues.

Figure 5C:
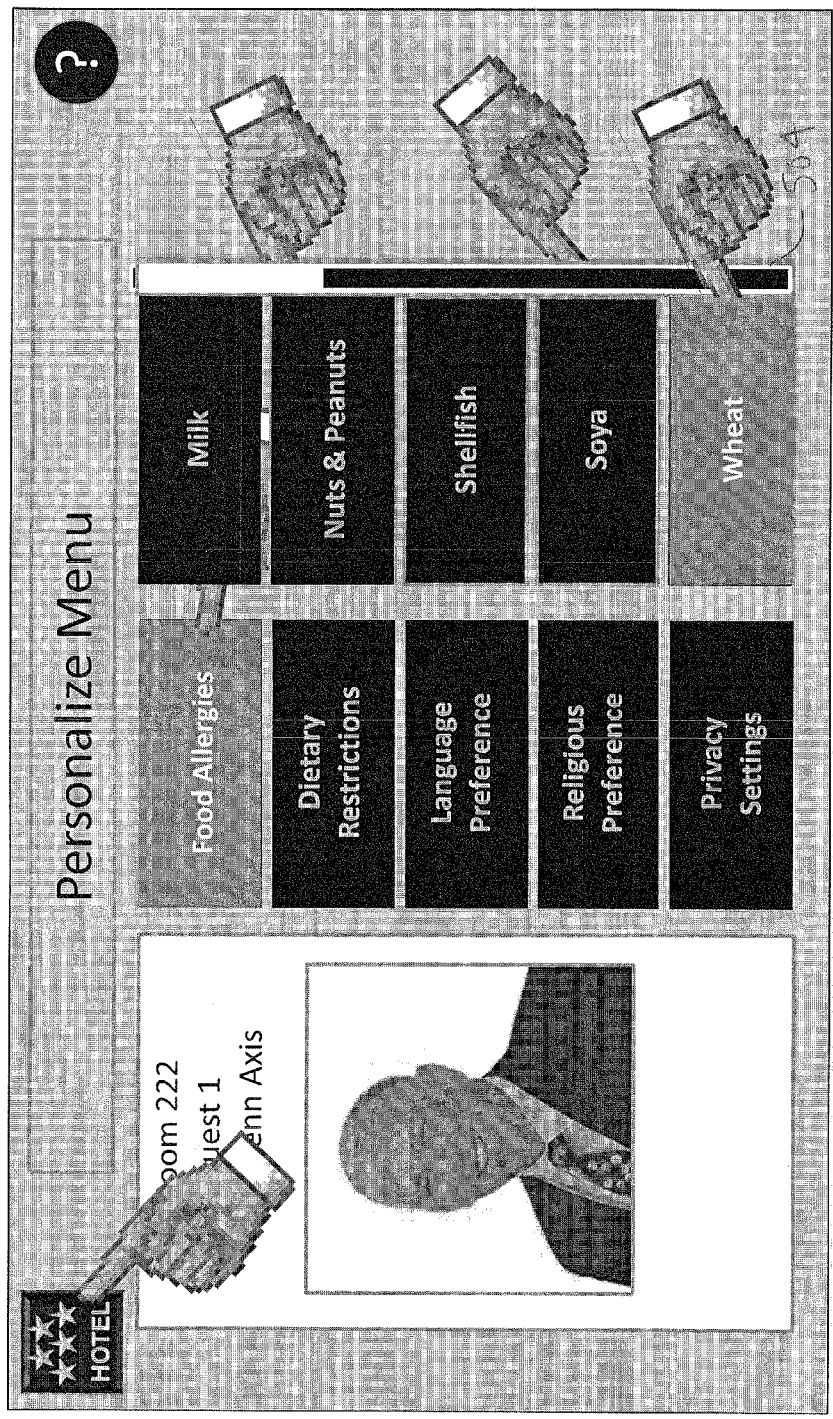
FIGS. 5A-5U illustrate example interfaces for use with aspects of the present invention.

Referring now to FIGS. 5A-5U, therein illustrated are example graphical user interface (GUI) screens illustrating example implementations of aspects of the present invention. An example GUI screen 500 for personalizing a user profile in accordance with an aspect of the present invention is illustrated in FIGS. 5A-5C. GUI screen 500 may display a list of personalization categories that a user may select for personalizing the user profile. Personalization categories may include, but are not limited to, food allergies, dietary restrictions, language preference (e.g., English, French, Spanish, etc.), religious preference, and privacy settings, among other categories for personalization. In addition, a user may personalize a user profile by uploading a photograph and/or other image of the user that was taken, for example, by a front desk of the hotel. For example, a user may select to update any food allergies 504 that the user has by selecting the type of foods that the user is allergic too (e.g., wheat, shellfish, peanuts, etc.), as illustrated in FIG. 5C. After the user selects the type of foods that the user is allergic too, the system may remove one or more foods containing the food allergies entered by the user from being presented to the user when the user, for example, uses the system to view a room service menu.

Referring back to FIG. 5A, a user may also select privacy settings 502 to personalize a level of privacy for the user's profile and/or review privacy settings previously selected. For example, the user may select whether to allow the system to observe the user selections and/or choices made by the user so that the system may provide recommendations for the user based upon the user's selections, as illustrated in FIG. 5B. In addition, the user may select one or more levels of privacy while interacting with the system. For example, the user may select a first restrictive privacy option, e.g., a highly restrictive privacy option, when the user is accompanied by family members. A second privacy option may be selected when the user is accompanied by the user's coworkers or business partners. A third, and least restrictive privacy option, may be selected when the guest is unaccompanied. When the user chooses the unaccompanied option, all previously recorded information on dining, entertainment and recreational choices may be used to update the recommendations to be presented to the user during their subsequent stay at the hotel. For example, if the hotel guest prefers to frequent a particular night club or consume alcoholic beverages when unaccompanied, this night club or type of beverage may not be displayed as a recommendation for entertainment or dining if the user selects the first and/or second privacy options (e.g., the user is accompanied by family members, coworkers, or business partners).

Figure 5D:
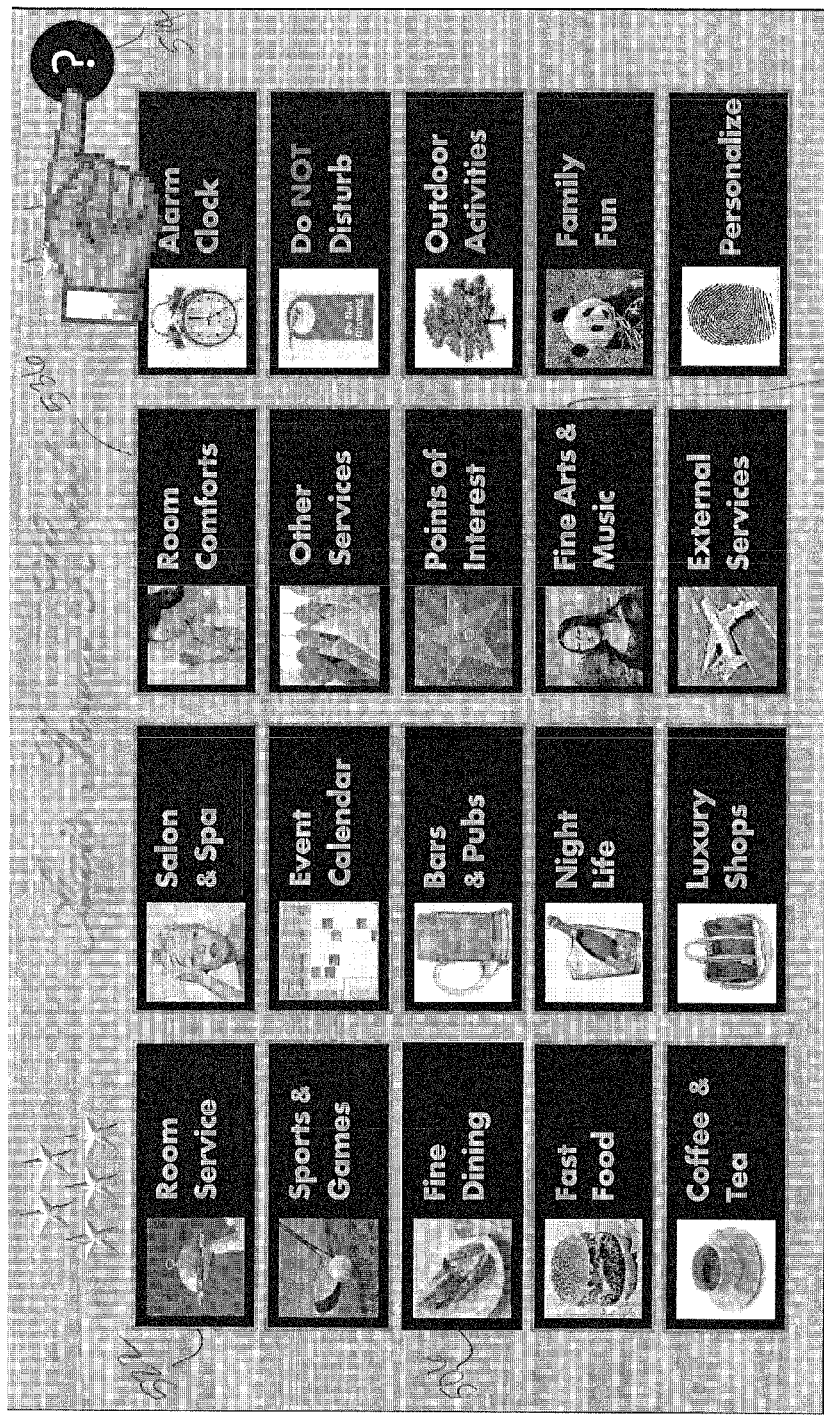
Figure 5E:
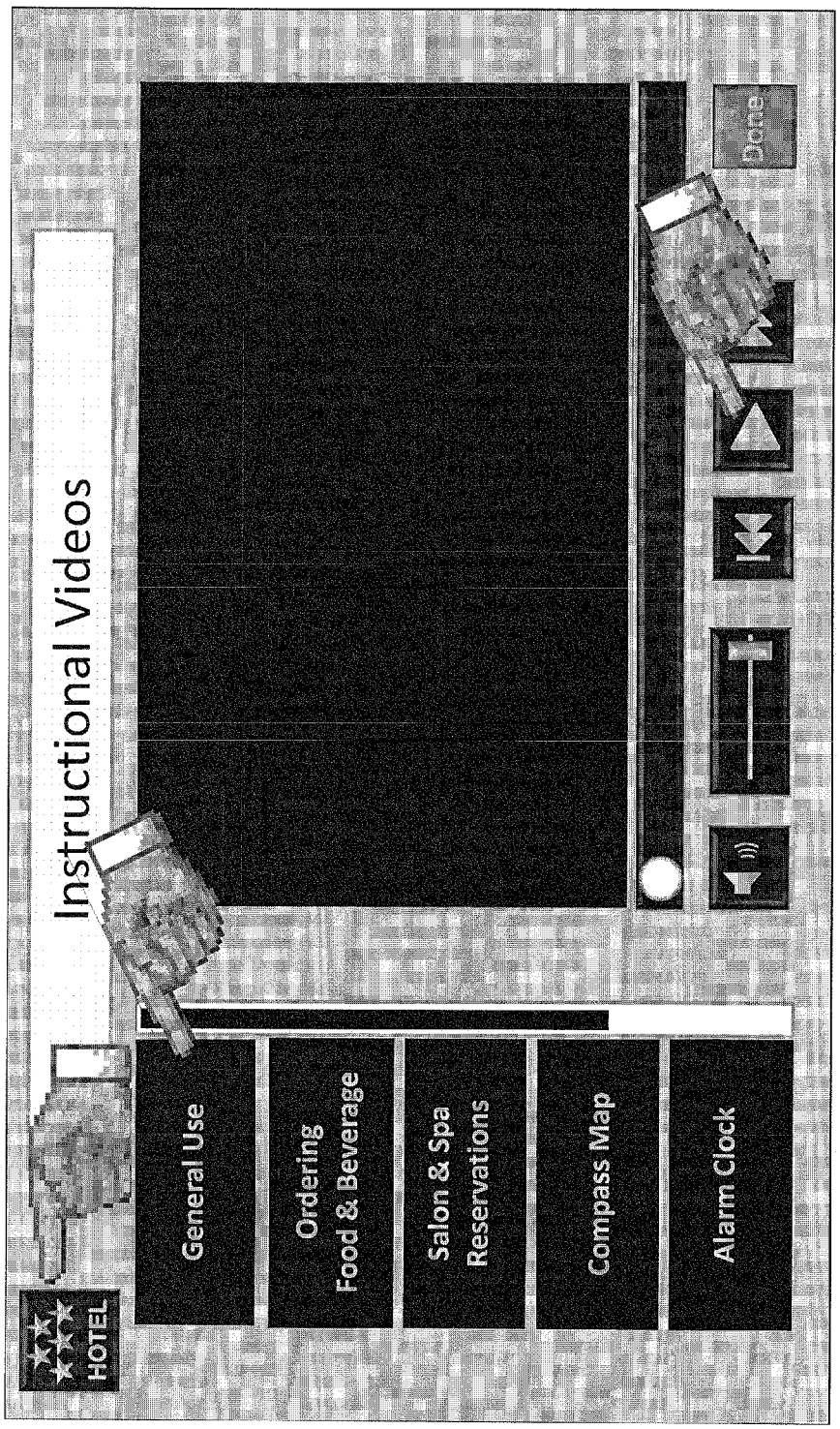

Referring to FIG. 5D, therein illustrated is an example menu of services and/or information capable of being accessed by the system. For example, if a user selects help button 514, instructions and/or instructional videos may be presented to a user explaining how to use the system, as illustrated in FIG. 5E.

Referring back to FIG. 5D, the user may select an item from the menu to obtain additional information about hotel services and/or activities or local area attractions. For example, if the user selects the "Fine Dining" category 506, interface 508 may be presented with additional information for dining options that the system recommends around the hotel, as illustrated in FIG. 5G. For example, interface 508 may present a map 510 showing the location of six restaurants that the system recommends for the user. Map 510 may illustrate, for example, a street view and/or a satellite image of the location of the six restaurants. In addition, interface 508 may present a list 512 of the six recommended restaurants shown on map 510, as well as any additional restaurants that may be near the hotel. The user may select a restaurant from the list, e.g., Axis Café, and map 510 may rotate to the selected restaurant and illustrate directions to the restaurant. In addition, additional information about the selected restaurant may be presented, such as images of the restaurant, menus, and reviews. The user may select a reservation button on the system to forward a request to the concierge to make a reservation for the user at the selected restaurant.

Referring back to FIG. 5D, if a user selects the "Fine Arts and Music" category 516, interface 520 may be presented with information about one or more museums in the area along with a map illustrating where the museums are located. The user may be able to rotate the map to various locations that are indicated, e.g., by a star, to view the location and/or directions to the various locations. For example, the user may push the plus (+) button above the map to rotate the map counterclockwise to the nearest star, e.g., Musee d'Axis (magnetic heading of 108 degrees from the hotel), or the user may push the minus (−) button above the map to rotate the map clockwise to the nearest star, e.g., the Soapera House (magnetic heading of 012 degrees from the hotel). The user may select a museum, e.g., Musee d'Axis, and additional information for the museum may be presented, as illustrated in FIG. 5I.

Figure 5J:
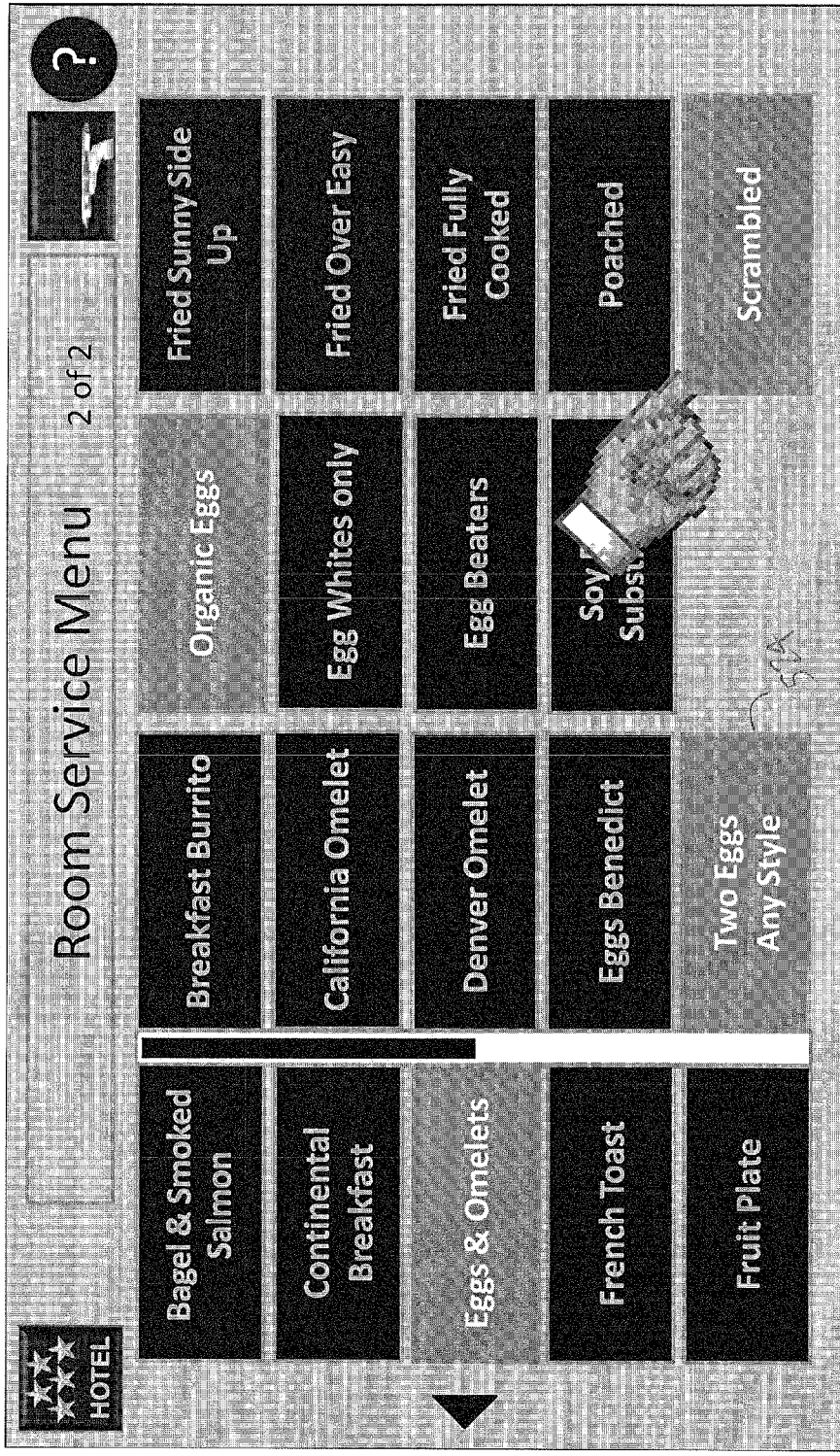
Figure 5K:
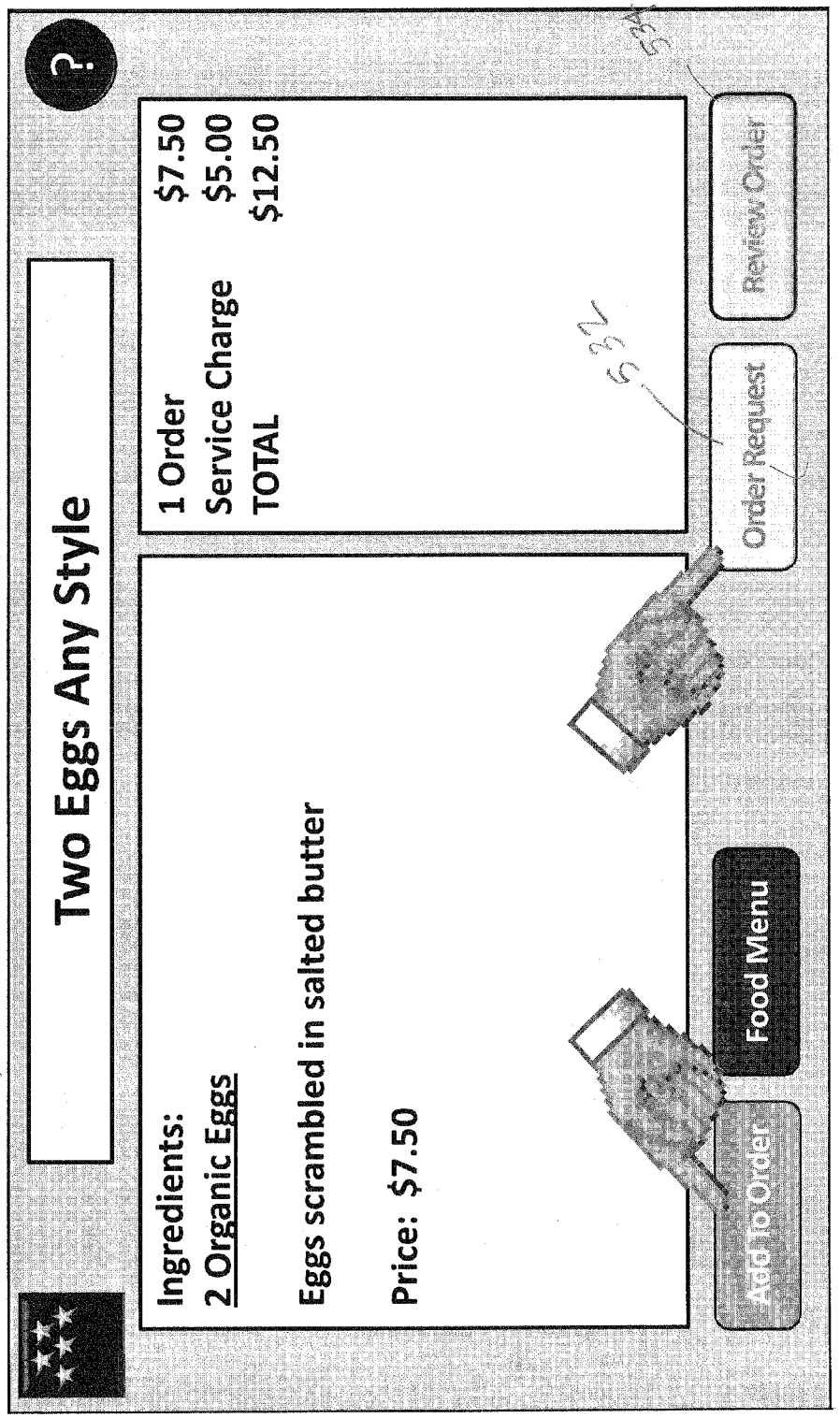
Figure 5L:
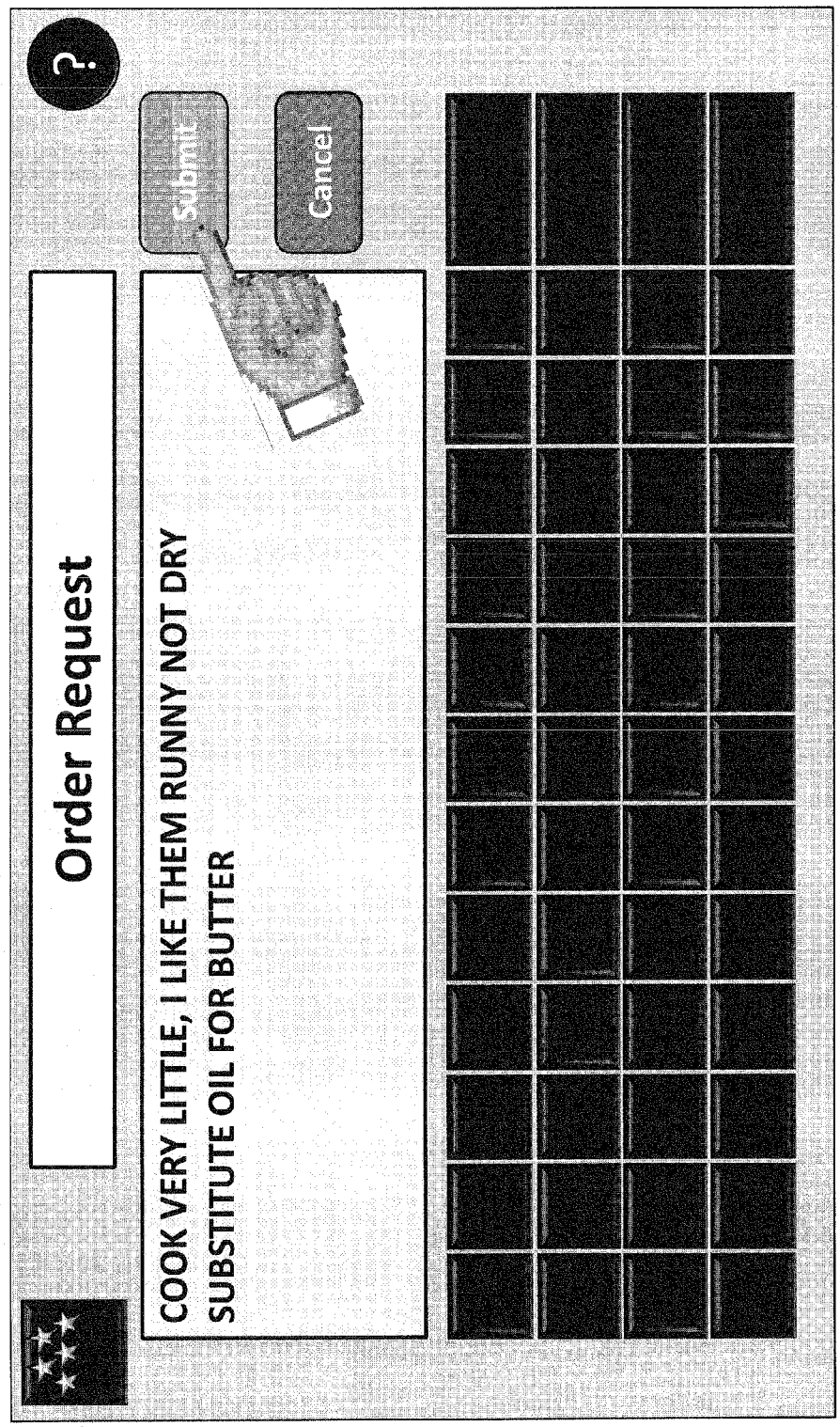

Referring back to FIG. 5D, if a user selects the "Room Service" category 522, a room service menu may be presented to the user, as illustrated in FIGS. 5J and 5O. Upon a user selecting a food or beverage option 524 from the room service menu, e.g., two eggs any style, interface 530 may be presented to the user displaying, for example, ingredients for the selected food or beverage, nutritional information, and the price for the selected food or beverage, as illustrated in FIG. 5K. Interface 530 may also provide a user with an option to submit an order request by selecting, for example, order request button 532. An order request may include, but is not limited to, instructions for how a selected food item should be prepared, as illustrated in FIG. 5L. In addition, interface 530 may provide a user an option to review an order prior to submitting the order to room service by selecting the review order button 534. Reviewing an order may include, reviewing the items ordered, the price for the items ordered, and any service and gratuity charges, as illustrated in FIG. 5M. In addition, the user may have an option to remove items from the order and/or add additional items to the order, as illustrated in FIGS. 5N-5Q.

Figure 5R:
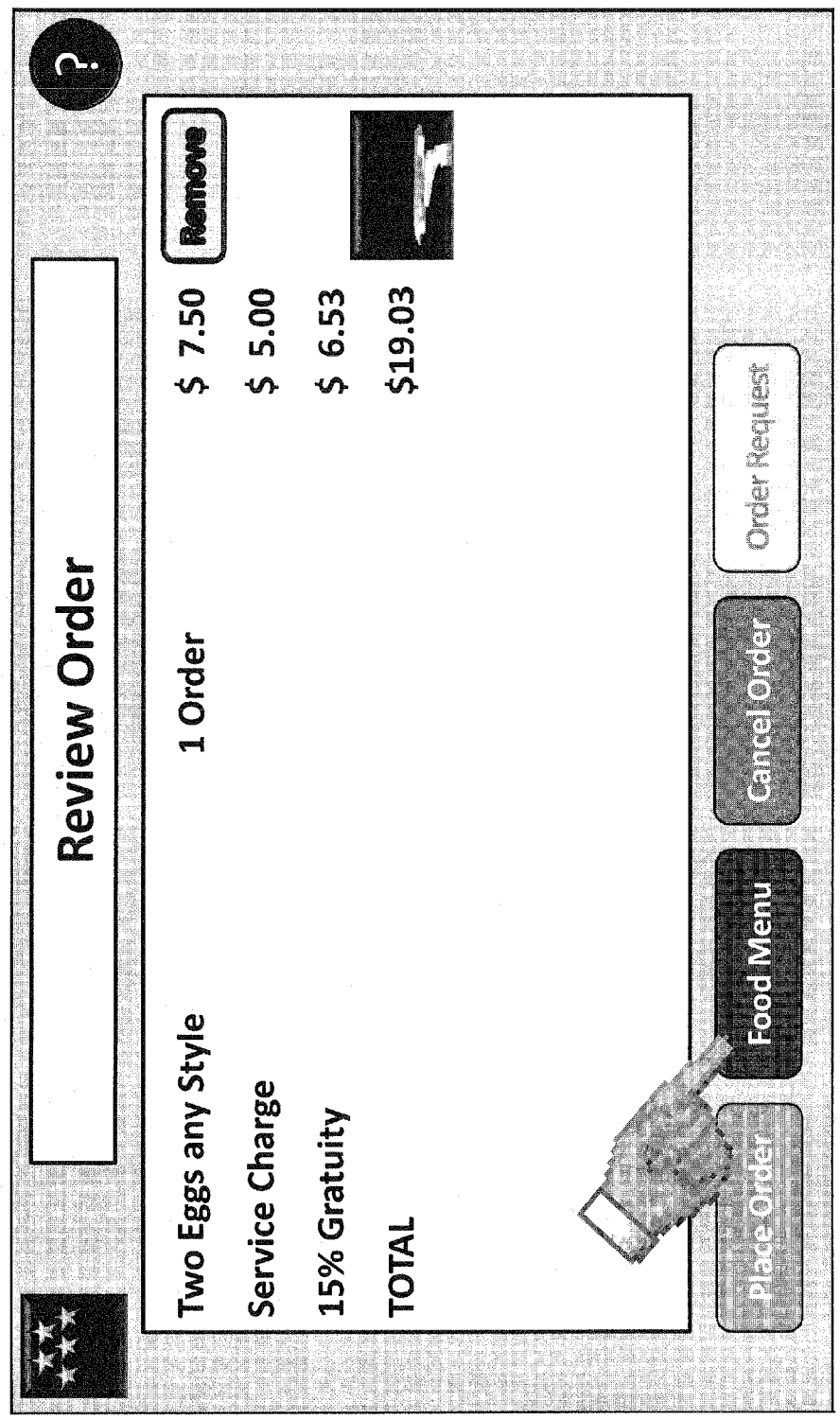
Figure 50:
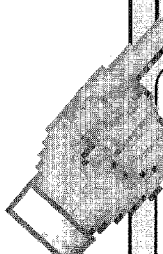
Figure 5P:
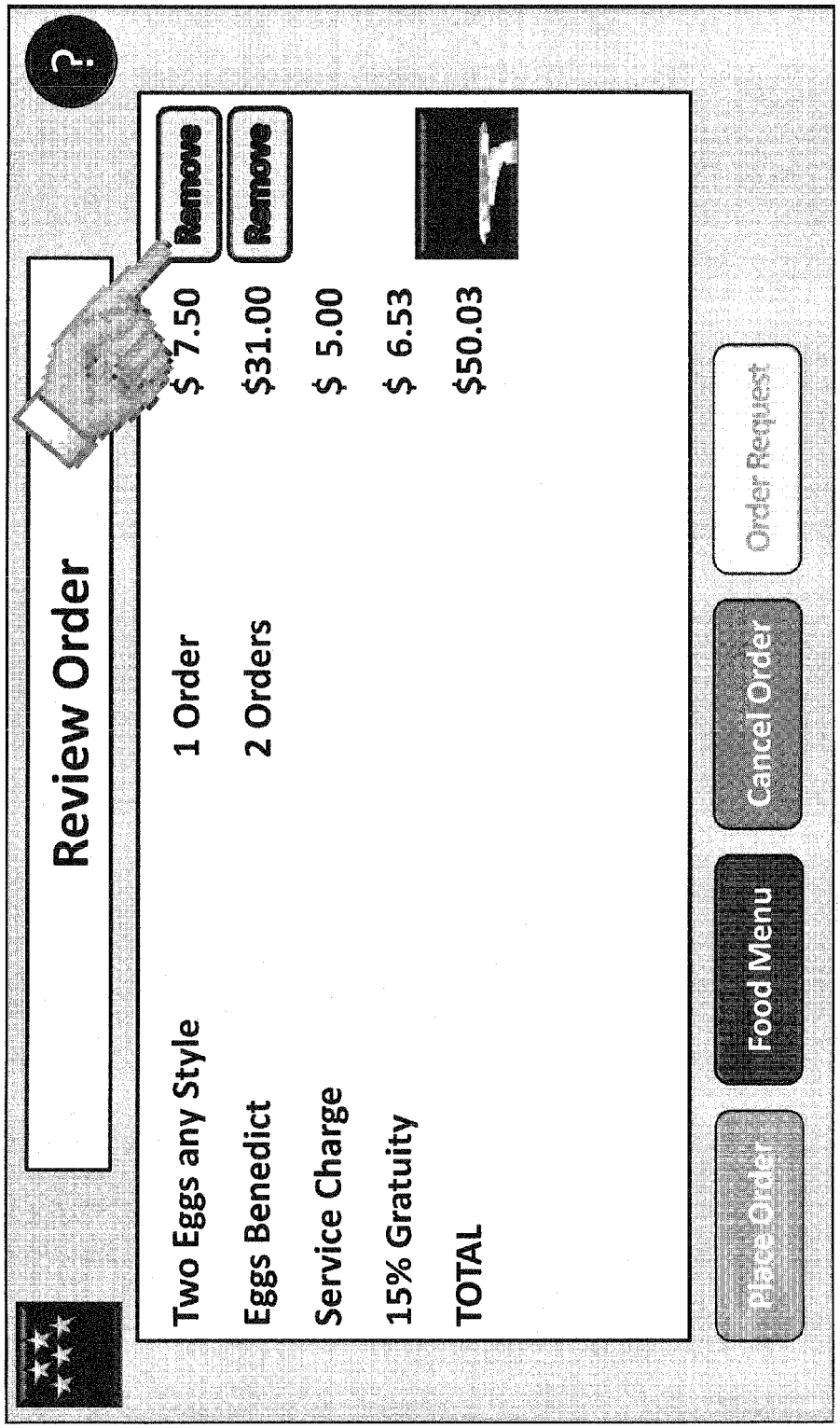
Figure 50:
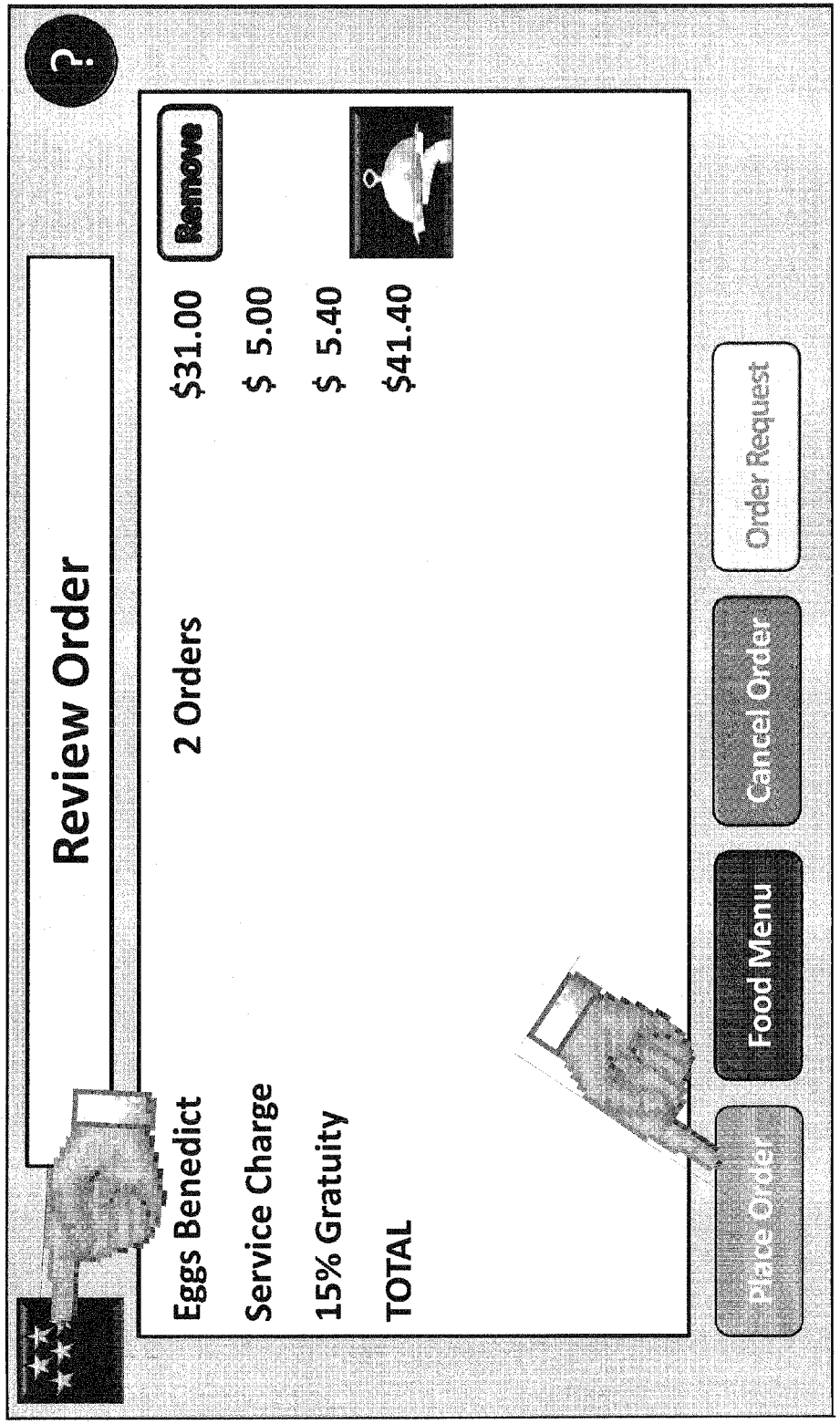
Figure 5F:
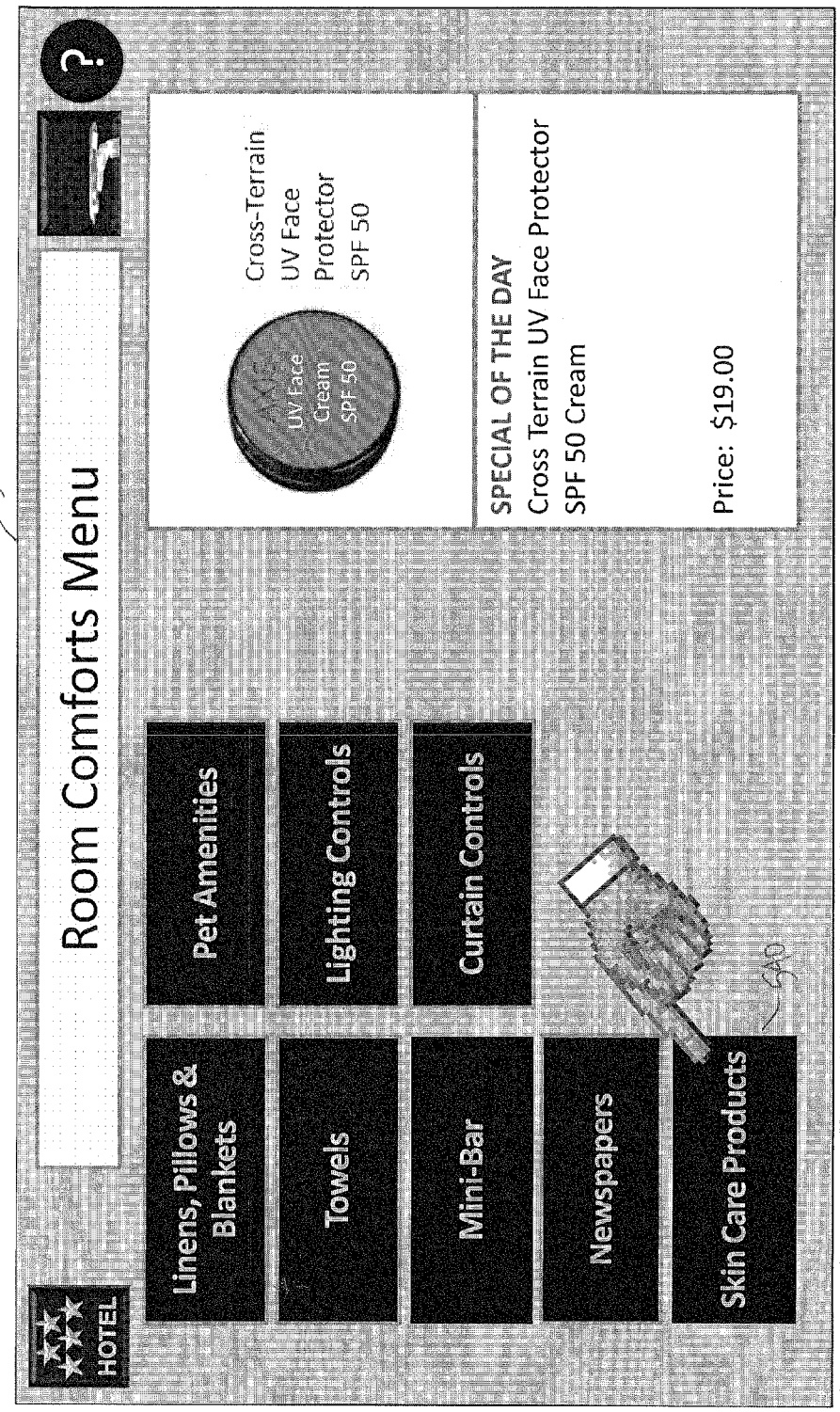
Figure 55:
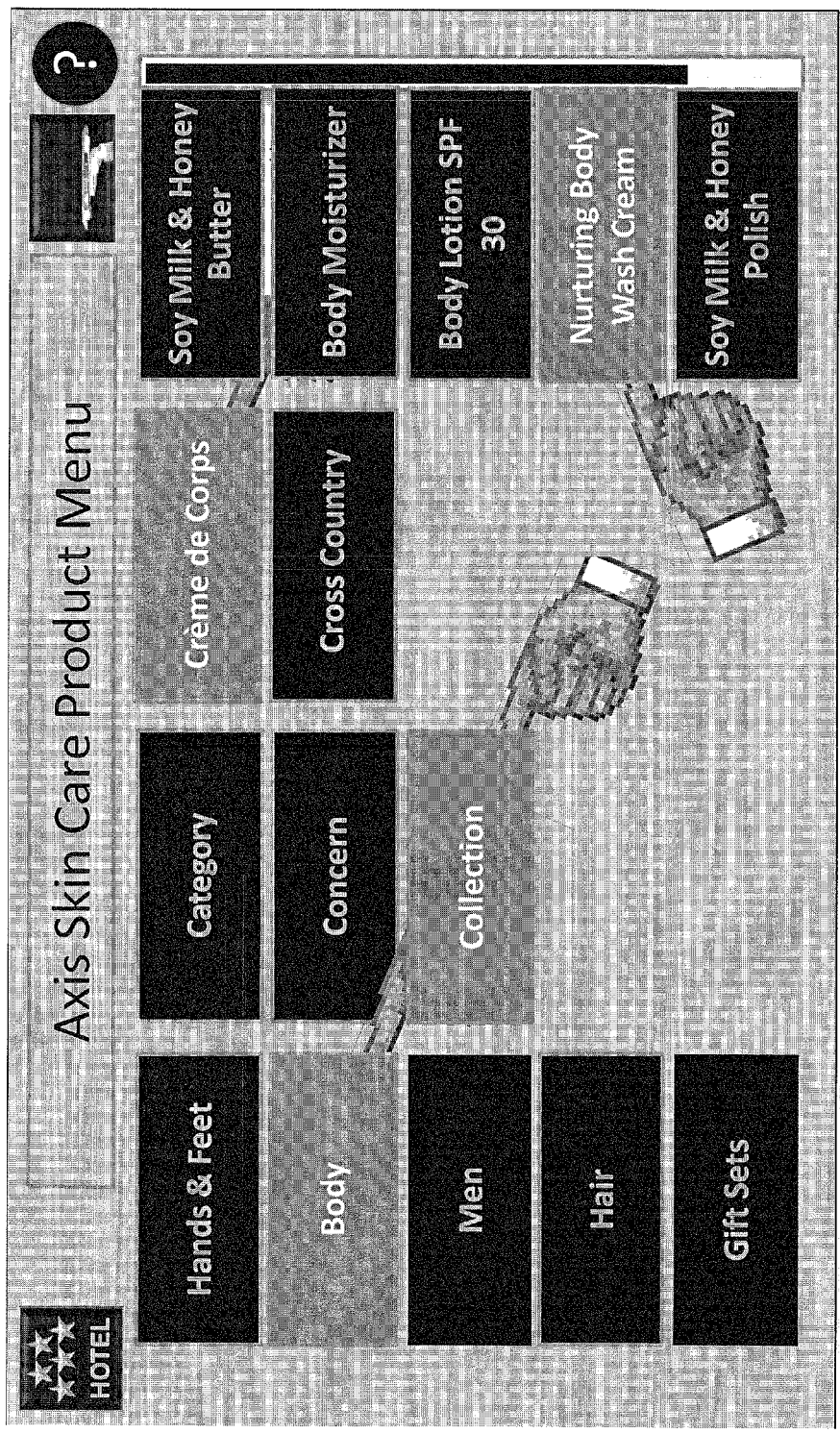
Figure 5W:
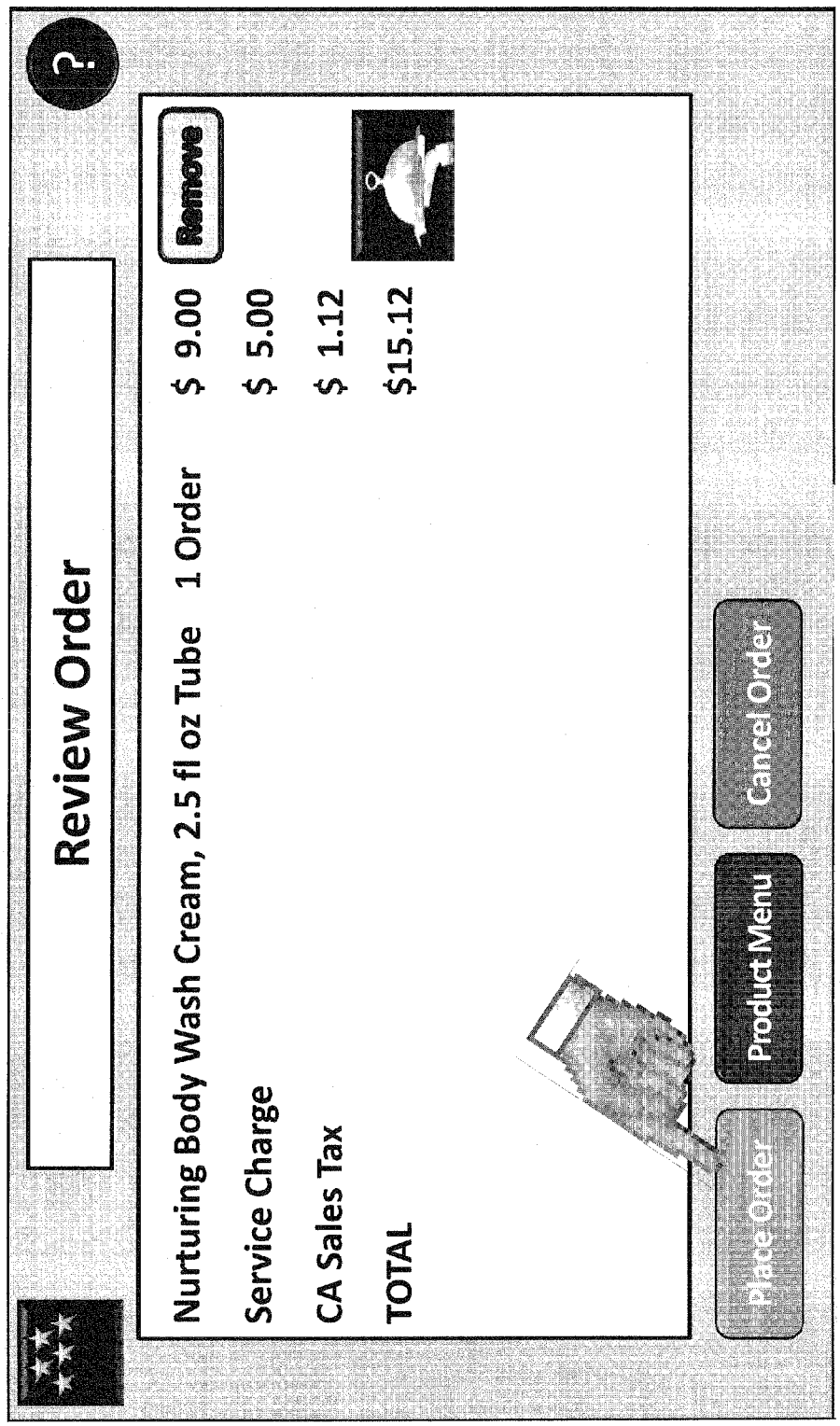

Referring back to FIG. 5D, if a user selects the "Room Comforts" category 536, interface 538 may be presented with a menu of room comfort selections, as illustrated in FIG. 5R. In addition, interface 538 may include any specials and/or advertisements for products that the hotel may sell, such as products that are used in the rooms, e.g., skin care products, bath products, bathrobes, etc. For example, if a user selects the "Skin Care Products" category 540, the user may have an option to order one or more skin care products sold by the hotel, as illustrated in FIGS. 5S-5U.

Aspects of the present invention may be implemented using hardware, software, or a combination thereof and may be implemented in one or more computer systems or other processing systems. In an aspect of the present invention, features are directed toward one or more computer systems capable of carrying out the functionality described herein. An example of such a computer system 100 is shown in FIG. 1.

Computer system 100 includes one or more processors, such as processor 104. The processor 104 is connected to a communication infrastructure 106 (e.g., a communications bus, cross-over bar, or network). Various software aspects are described in terms of this example computer system. After reading this description, it will become apparent to a person skilled in the relevant art(s) how to implement aspects of the invention using other computer systems and/or architectures.

Computer system 100 can include a display interface 102 that forwards graphics, text, and other data from the communication infrastructure 106 (or from a frame buffer not shown) for display on a display unit 130. Computer system 100 also includes a main memory 108, preferably random access memory (RAM), and may also include a secondary memory 110. The secondary memory 110 may include, for example, a hard disk drive 112 and/or a removable storage drive 114, representing a floppy disk drive, a magnetic tape drive, an optical disk drive, etc. The removable storage drive 114 reads from and/or writes to a removable storage unit 118 in a well-known manner. Removable storage unit 118, represents a floppy disk, magnetic tape, optical disk, etc., which is read by and written to removable storage drive 114. As will be appreciated, the removable storage unit 118 includes a computer usable storage medium having stored therein computer software and/or data.

Alternative aspects of the present invention may include secondary memory 110 and may include other similar devices for allowing computer programs or other instructions to be loaded into computer system 100. Such devices may include, for example, a removable storage unit 122 and an interface 120. Examples of such may include a program cartridge and cartridge interface (such as that found in video game devices), a removable memory chip (such as an erasable programmable read only memory (EPROM), or programmable read only memory (PROM)) and associated socket, and other removable storage units 122 and interfaces 120, which allow software and data to be transferred from the removable storage unit 122 to computer system 100.

Computer system 100 may also include a communications interface 124. Communications interface 124 allows software and data to be transferred between computer system 100 and external devices. Examples of communications interface 124 may include a modem, a network interface (such as an Ethernet card), a communications port, a Personal Computer Memory Card International Association (PCMCIA) slot and card, etc. Software and data transferred via communications interface 124 are in the form of signals 128, which may be electronic, electromagnetic, optical or other signals capable of being received by communications interface 124. These signals 128 are provided to communications interface 124 via a communications path (e.g., channel) 126. This path 126 carries signals 128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 180, a hard disk installed in hard disk drive 170, and signals 128. These computer program products provide software to the computer system 100. The invention is directed to such computer program products.

Computer programs (also referred to as computer control logic) are stored in main memory 108 and/or secondary memory 110. Computer programs may also be received via communications interface 124. Such computer programs, when executed, enable the computer system 100 to perform the features in accordance with aspects of the present invention, as discussed herein. In particular, the computer programs, when executed, enable the processor 110 to perform the features in accordance with aspects of the present invention. Accordingly, such computer programs represent controllers of the computer system 100.

In an aspect of the present invention where the invention is implemented using software, the software may be stored in a computer program product and loaded into computer system 100 using removable storage drive 114, hard drive 112, or communications interface 120. The control logic (software), when executed by the processor 104, causes the processor 104 to perform the functions described herein. In another aspect of the present invention, the system is implemented primarily in hardware using, for example, hardware components, such as application specific integrated circuits (ASICs). Implementation of the hardware state machine so as to perform the functions described herein will be apparent to persons skilled in the relevant art(s).

In yet another aspect of the present invention, the invention is implemented using a combination of both hardware and software.

Figure 2:
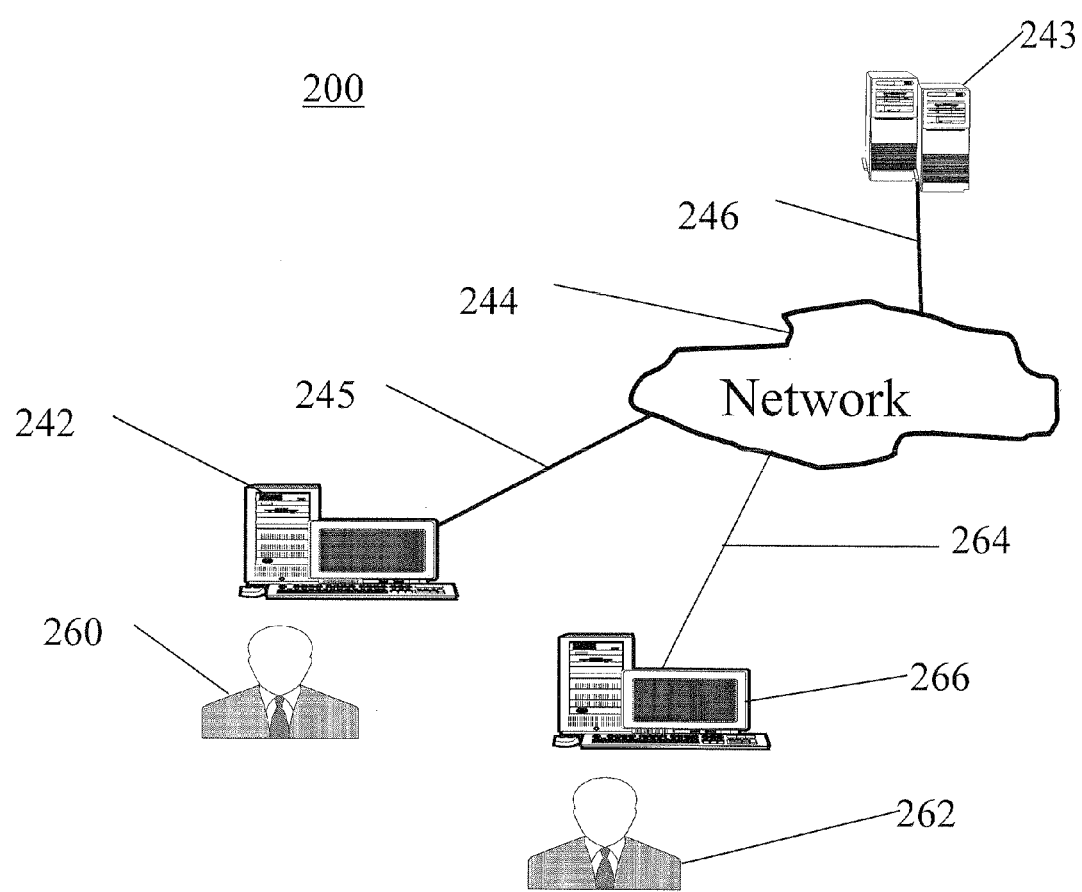
FIG. 2 illustrates an example system diagram of various hardware components and other features for use in accordance with aspects of the present invention.

FIG. 2 shows a communication system 200 usable in accordance with aspects of the present invention. The communication system 200 includes one or more accessors 260, 262 (also referred to interchangeably herein as one or more "users") and one or more terminals 242, 266. In one aspect of the present invention, data for use is, for example, input and/or accessed by accessors 260, 264 via terminals 242, 266, such as personal computers (PCs), minicomputers, mainframe computers, microcomputers, a television interface, telephonic devices, mobile devices, or wireless devices, such as personal digital assistants ("PDAs") or a hand-held wireless devices coupled to a server 243, such as a PC, minicomputer, mainframe computer, microcomputer, or other device having a processor and a repository for data and/or connection to a repository for data, via, for example, a network 244, such as the Internet or an intranet, and couplings 245, 246, 264. The couplings 245, 246, 264 include, for example, wired, wireless, or fiber optic links. In another aspect of the present invention, the method and system of the present invention operate in a stand-alone environment, such as on a single terminal.

While the present invention has been described in connection with aspects of the present invention, it will be understood by those skilled in the art that variations and modifications of the aspects of the present invention described above may be made without departing from the scope of the invention. Other aspects will be apparent to those skilled in the art from a consideration of the specification or from a practice of the invention disclosed herein.

The invention claimed is:

1. A method for collecting and receiving information via an apparatus provided by a business to a first user comprising a processor connected via a network, comprising:
   determining directional movement, via a magnetometer, of the apparatus provided by the business;
   displaying a plurality of categories related to a good or service offered by the business to the first user based upon a privacy selection of the first user;
   receiving, via a receiver comprising an interface, a first input of information from the first user related to the service or good offered by the business;
   filtering received first input of information from the first user based upon the privacy selection of the first user;
   storing, via a memory, the first input of information;
   analyzing, via the processor, the first input of information by applying a predictive algorithm capable of anticipating and assessing the probability of an event to generate a targeted recommendation derived from the first input of information;
   generating a report based on the targeted recommendation;

transmitting, via a wired or a wireless transmitter, the generated report comprising the targeted recommendation to management of the business;

changing, in response to the recommendation to the management of the business, at least one good or service from a plurality of goods or services offered by the business to the first user and a second user based on the targeted recommendation based on at least the first input of information from the first user;

displaying the plurality of categories relating to the good or service offered by the business including the at least one changed good or service to the second user based upon a privacy selection of the second user; and providing directions to a first user, to a selected local area attraction from a list of recommended local area attractions generated based on the first input of information, and with respect to the determined directional movement of the apparatus.

2. The method of claim 1, wherein the information comprises at least one of guest demographic information, dining selections, room service orders, activity selections, and product purchases.

3. The method of claim 1, wherein the targeted recommendation comprises at least one of changing services offered by the business, providing advertisements for services offered by the business, changing dining options offered by the business, providing additional dining options offered by the business, and changing amenities provided by the business.

4. The method of claim 1, further comprising:
receiving a second input of information from the first user;
performing, via the processor, an action based upon the second input of information; and
performing, via an infrared module, at least one of turning on a light in a room, turning off a light in a room, adjusting a room temperature, adjusting curtains in a room, and adjusting blinds in a room, based on the second input of information.

5. The method of claim 4, wherein the action comprises at least one of presenting a restaurant or room service menu, providing an order for restaurant or room service, ordering tickets to an activity, making a reservation at a restaurant, and purchasing products.

6. The method of claim 4, further comprising storing the second input of information in association with the first user who provided the second input of information.

7. The method of claim 6, further comprising providing a second recommendation to the first user based on the second input of information.

8. The method of claim 7, wherein the second recommendation comprises at least one of an event, local area attractions, dining options, and products for purchase.

9. The method of claim 1, wherein changing the good or service offered by the business comprises changing the service offered by the business to a plurality of users based on the targeted recommendation derived from the first input of information from the first user.

10. An apparatus provided by a business to a first user for collecting information comprising a processor connected via a network, comprising:
a magnetometer configured to detect directional movement of the apparatus provided by the business;
a display configured to display a plurality of categories related to a good or service offered by the business to the first user based upon a privacy selection of the first user;
a memory configured to store a first input of information; and
a processor coupled to the memory and configured to:
receive the first input of information from the first user related to the service or good offered by the business;
filter the received first input of information from the first user based upon the privacy selection of the first user;
analyze the first input of information by applying a predictive algorithm capable of anticipating and assessing the probability of an event to generate a targeted recommendation derived from the first input of information;
generate a report based on the targeted recommendation;
transmit the generated report comprising the targeted recommendation to management of the business;
change, in response to the recommendation to the management of the business at least one good or service from a plurality of goods or services offered by the business to the first user and a second user based on the targeted recommendation based on at least the one or more inputs of information from the first user;
display the plurality of categories relating to the good or service offered by the business including the at least one changed good or service to the second user based upon a privacy selection of the second user; and
provide directions to a first user, to a selected local area attraction from a list of recommended local area attractions generated based on the first input of information, and with respect to the determined directional movement of the apparatus.

11. The apparatus of claim 10, wherein the processor is further configured to:
receive a second input of information from the first user;
perform an action based upon the second input of information; and wherein the apparatus further comprises:
an infrared module configured to perform at least one of turning on a light in a room, turning off a light in a room, adjusting a room temperature, adjusting curtains in a room, and adjusting blinds in a room, based on the second input of information.

12. The apparatus of claim 11, wherein the action comprises at least one of presenting a room or restaurant service menu, providing an order for room or restaurant service, ordering tickets to an activity, making a reservation at a restaurant, and purchasing products.

13. The apparatus of claim 11, wherein the memory further configured to:
store the second input of information in association with the first user who provided the second input of information.

14. The apparatus of claim 13, wherein the processor is further configured to:
provide a second recommendation to the first user based on the second input of information.

15. The apparatus of claim 14, wherein the second recommendation comprises at least one of an event, local area attractions, dining options, and products for purchase.

16. The apparatus of claim 11, further comprising an interface module,
wherein the interface module presents a map that rotates in accordance with changes in the directional movement of the apparatus.

17. The apparatus of claim 11, further comprising a digital compass.

18. A computer product comprising a durable computer readable medium having control logic stored therein for causing a computer provided by a business to a first user to collect information and being connected via a network, the control logic comprising:
  computer readable program code means for detecting directional movement of the computer provided by the business comprising a magnetometer;
  computer readable program code means for displaying a plurality of categories related to a good or service offered by the business to the first user based upon a privacy selection of the first user
  computer readable program code means for receiving a first input of information from the first user related to the good or service offered by the business;
  computer readable program code means for storing the first input of information;
  computer readable program code means for analyzing the first input of information by applying a predictive algorithm capable of anticipating and assessing the probability of an event to generate a targeted recommendation derived from the first input of information;
  computer readable program code means for generating a report based on the targeted recommendation;
  computer readable program code means for transmitting the generated report comprising the targeted recommendation to management of the business;
  computer readable program code means for changing, in response to the recommendation to the management of the business, at least one good or service from a plurality of goods or services offered by the business to the first user and a second user based on the targeted recommendation based on at least the first input of information from the first user;
  computer readable program code means for displaying the plurality of categories relating to the good or service offered by the business including the at least one changed good or service to the second user based upon a privacy selection of the second user; and
  computer readable program code means for providing directions to a first user, to a selected local area attraction from a list of recommended local area attractions generated based on the first input of information, and with respect to the determined directional movement of the apparatus.

* * * * *